(12) United States Patent
Hamaguchi et al.

(10) Patent No.: US 10,509,497 B2
(45) Date of Patent: Dec. 17, 2019

(54) DISPLAY MODULE, TOUCH PANEL CONTROLLER, AND ELECTRONIC DEVICE

(71) Applicant: SHARP KABUSHIKI KAISHA, Sakai, Osaka (JP)

(72) Inventors: Mutsumi Hamaguchi, Sakai (JP); Masayuki Miyamoto, Sakai (JP); Shinji Shinjo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/774,701

(22) PCT Filed: Sep. 8, 2016

(86) PCT No.: PCT/JP2016/076405
§ 371 (c)(1),
(2) Date: May 9, 2018

(87) PCT Pub. No.: WO2017/090299
PCT Pub. Date: Jun. 1, 2017

(65) Prior Publication Data
US 2018/0329548 A1 Nov. 15, 2018

(30) Foreign Application Priority Data
Nov. 25, 2015 (JP) .................................. 2015-230107

(51) Int. Cl.
G06F 3/041 (2006.01)
G06F 3/044 (2006.01)
G09G 3/20 (2006.01)

(52) U.S. Cl.
CPC ............ G06F 3/0412 (2013.01); G06F 3/044 (2013.01); G06F 3/0416 (2013.01); G09G 3/20 (2013.01)

(58) Field of Classification Search
CPC ....................................................... G06F 3/041
See application file for complete search history.

(56) References Cited

U.S. PATENT DOCUMENTS

| | | |
|---|---|---|
| 2014/0104236 A1 | 4/2014 | Hamaguchi et al. |
| 2014/0375608 A1* | 12/2014 | Yumoto ................. G06F 3/041 345/174 |
| 2015/0185927 A1* | 7/2015 | Inoue ..................... G06F 3/044 345/174 |

FOREIGN PATENT DOCUMENTS

| | | |
|---|---|---|
| JP | 2009-294903 A | 12/2009 |
| JP | 2013-003603 A | 1/2013 |
| WO | 2014/061261 A1 | 4/2014 |

* cited by examiner

Primary Examiner — Roy P Rabindranath
(74) Attorney, Agent, or Firm — ScienBiziP, P.C.

(57) ABSTRACT

To acquire touch position data with a good SN ratio without affecting a display action of a display element, a touch panel includes a non-drive region and a drive region. The non-drive region moves so as to correspond to one of a plurality of scanning signal lines selected and driven in order in a display period included in each frame of a display element. The drive region represents a region except for the non-drive region. A touch panel controller drives a signal line corresponding to the drive region and stops driving a signal line corresponding to the non-drive region.

10 Claims, 17 Drawing Sheets

FIG. 3A $$M1 = \begin{pmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{pmatrix}$$

$$M1t = \begin{pmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{pmatrix}$$

=

$$M3 = \begin{pmatrix} 1 & 1 & 1 & 1 & 1 & 1 & 7 \\ 1 & 1 & 1 & 1 & 1 & 7 & 1 \\ 1 & 1 & 1 & 1 & 7 & 1 & 1 \\ 1 & 1 & 1 & 7 & 1 & 1 & 1 \\ 1 & 1 & 7 & 1 & 1 & 1 & 1 \\ 1 & 7 & 1 & 1 & 1 & 1 & 1 \\ 7 & 1 & 1 & 1 & 1 & 1 & 1 \end{pmatrix}$$

FIG. 3B $$M2 = \begin{pmatrix} 1 & 0 & 1 & 1 & 1 & 0 & 0 \\ 0 & 1 & 1 & 1 & 0 & 0 & 1 \\ 1 & 1 & 1 & 0 & 0 & 1 & 0 \\ 1 & 1 & 0 & 0 & 1 & 0 & 1 \\ 1 & 0 & 0 & 1 & 0 & 1 & 1 \\ 0 & 0 & 1 & 0 & 1 & 1 & 1 \\ 0 & 1 & 0 & 1 & 1 & 1 & 0 \end{pmatrix}$$

$$M1t = \begin{pmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{pmatrix}$$

=

$$M4 = \begin{pmatrix} 0 & 0 & 0 & 0 & 0 & 0 & 4 \\ 0 & 0 & 0 & 0 & 0 & 4 & 0 \\ 0 & 0 & 0 & 0 & 4 & 0 & 0 \\ 0 & 0 & 0 & 4 & 0 & 0 & 0 \\ 0 & 0 & 4 & 0 & 0 & 0 & 0 \\ 0 & 4 & 0 & 0 & 0 & 0 & 0 \\ 4 & 0 & 0 & 0 & 0 & 0 & 0 \end{pmatrix}$$

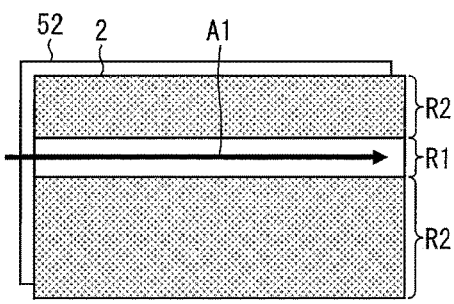
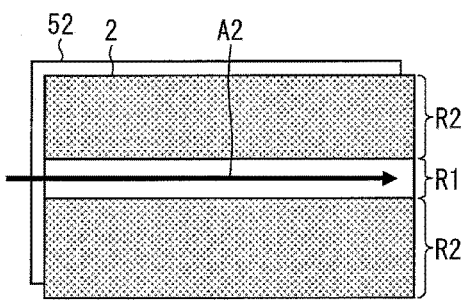

FIG. 5A $$M1a = \begin{bmatrix} 0 & 0 & 0 & 0 & 0 & 0 & 0 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{bmatrix}$$

FIG. 5B $$M1b = \begin{bmatrix} -1 & -1 & 1 & 1 & 1 & -1 & 1 \\ 0 & 0 & 0 & 0 & 0 & 0 & 0 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{bmatrix}$$

FIG. 5C $$M1c = \begin{bmatrix} -1 & -1 & 1 & 1 & 1 & -1 & 1 \\ 1 & -1 & -1 & 1 & 1 & 1 & -1 \\ 0 & 0 & 0 & 0 & 0 & 0 & 0 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{bmatrix}$$

FIG. 5D $$M1d = \begin{bmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 0 & 0 & 0 & 0 & 0 & 0 & 0 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{bmatrix}$$

FIG. 5E $$M1e = \begin{bmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 0 & 0 & 0 & 0 & 0 & 0 & 0 \\ 1 & 1 & 1 & -1 & 1 & -1 & -1 \\ -1 & 1 & 1 & 1 & -1 & 1 & -1 \end{bmatrix}$$

FIG. 5F $$M1f = \begin{bmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 0 & 0 & 0 & 0 & 0 & 0 & 0 \\ -1 & 1 & 1 & 1 & -1 & 1 & -1 \end{bmatrix}$$

FIG. 5G $$M1g = \begin{bmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ 0 & 0 & 0 & 0 & 0 & 0 & 0 \end{bmatrix}$$

|  | phase0 | phase1 |
|---|---|---|
| AFE0 | DS1 – DS0 | DS2 – DS1 |
| AFE1 | DS3 – DS2 | DS4 – DS3 |
| AFE2 | DS5 – DS4 | DS6 – DS5 |
| AFE3 | DS7 – DS6 | DS8 – DS7 |
| AFE4 | DS9 – DS8 | DS10 – DS9 |
| AFE5 | DS11 – DS10 | DS12 – DS11 |
| AFE6 | DS13 – DS12 | DS14 – DS13 |
| AFE7 | DS15 – DS14 | DS16 – DS15 |
| AFE8 | DS17 – DS16 | DS18 – DS17 |
| AFE9 | DS19 – DS18 | DS20 – DS19 |
| AFE10 | DS21 – DS20 | DS22 – DS21 |
| AFE11 | DS23 – DS22 | DS24 – DS23 |
| AFE12 | DS25 – DS24 | DS26 – DS25 |
| AFE13 | DS27 – DS26 | DS28 – DS27 |
| AFE14 | DS29 – DS28 | DS30 – DS29 |
| AFE15 | DS31 – DS30 |  |

FIG. 8B

|  | phase0 | phase1 |
|---|---|---|
| AFE0 | DS2 – DS0 | DS4 – DS2 |
| AFE1 | DS3 – DS1 | DS5 – DS3 |
| AFE2 | DS6 – DS4 | DS8 – DS6 |
| AFE3 | DS7 – DS5 | DS9 – DS7 |
| AFE4 | DS10 – DS8 | DS12 – DS10 |
| AFE5 | DS11 – DS9 | DS13 – DS11 |
| AFE6 | DS14 – DS12 | DS16 – DS14 |
| AFE7 | DS15 – DS13 | DS17 – DS15 |
| AFE8 | DS18 – DS16 | DS20 – DS18 |
| AFE9 | DS19 – DS17 | DS21 – DS19 |
| AFE10 | DS22 – DS20 | DS24 – DS22 |
| AFE11 | DS23 – DS21 | DS25 – DS23 |
| AFE12 | DS26 – DS24 | DS28 – DS26 |
| AFE13 | DS27 – DS25 | DS29 – DS27 |
| AFE14 | DS30 – DS28 |  |
| AFE15 | DS31 – DS29 |  |

FIG. 8C

|  | phase0 | phase1 |
|---|---|---|
| AFE0 | DS4 – DS0 | DS8 – DS4 |
| AFE1 | DS5 – DS1 | DS9 – DS5 |
| AFE2 | DS6 – DS2 | DS10 – DS6 |
| AFE3 | DS7 – DS3 | DS11 – DS7 |
| AFE4 | DS12 – DS8 | DS16 – DS12 |
| AFE5 | DS13 – DS9 | DS17 – DS13 |
| AFE6 | DS14 – DS10 | DS18 – DS14 |
| AFE7 | DS15 – DS11 | DS19 – DS15 |
| AFE8 | DS20 – DS16 | DS24 – DS20 |
| AFE9 | DS21 – DS17 | DS25 – DS21 |
| AFE10 | DS22 – DS18 | DS26 – DS22 |
| AFE11 | DS23 – DS19 | DS27 – DS23 |
| AFE12 | DS28 – DS24 |  |
| AFE13 | DS29 – DS25 |  |
| AFE14 | DS30 – DS26 |  |
| AFE15 | DS31 – DS27 |  |

| | phase0 | phase1 |
|---|---|---|
| AFE0 | ( DS3+DS2 )−( DS1+DS0 ) | ( DS5+DS4 )−( DS3+DS2 ) |
| AFE1 | ( DS7+DS6 )−( DS5+DS4 ) | ( DS9+DS8 )−( DS7+DS6 ) |
| AFE2 | (DS11+DS10)−( DS9+DS8 ) | (DS13+DS12)−(DS11+DS10) |
| AFE3 | (DS15+DS14)−(DS13+DS12) | (DS17+DS16)−(DS15+DS14) |
| AFE4 | (DS19+DS18)−(DS17+DS16) | (DS21+DS20)−(DS19+DS18) |
| AFE5 | (DS23+DS22)−(DS21+DS20) | (DS25+DS24)−(DS23+DS22) |
| AFE6 | (DS27+DS26)−(DS25+DS24) | (DS29+DS28)−(DS27+DS26) |
| AFE7 | (DS31+DS30)−(DS29+DS28) | |

FIG. 12

DISPLAY MODULE, TOUCH PANEL CONTROLLER, AND ELECTRONIC DEVICE

TECHNICAL FIELD

The present invention relates to a display module relating to a touch panel disposed on a display surface of a display element, a touch panel controller, and an electronic device.

BACKGROUND ART

In the related art, a display module has been known that includes a touch panel disposed on a display region of a display element. As the display element, an active matrix liquid crystal display panel has been known that includes a liquid crystal sandwiched between two substrates facing each other and a TFT as a switching element in each display pixel. Such an active matrix liquid crystal display panel is driven by a scanning drive circuit that successively selects a scanning signal line formed in the liquid crystal display panel to turn on each TFT in order only in a predetermined period and a data drive circuit that supplies a display signal voltage to a data signal line corresponding to a scanning signal line selected by the scanning drive circuit to write the display signal voltage to each display pixel.

A touch panel includes a capacitor formed between each of a plurality of first signal lines and each of a plurality of second signal lines. Further, the first signal line is driven to read a linear sum signal based on an electric charge accumulated in each capacitor from the second signal line, and a touch position is detected on the touch panel on the basis of the read linear sum signal.

The scanning drive circuit described above selects each of the scanning signal lines in synchronization with a horizontal synchronization signal. The data drive circuit switches the display signal voltage supplied to the data signal line in synchronization with the horizontal synchronization signal. Thus, noise is generated in synchronization with the horizontal synchronization signal. The noise is then superimposed on a voltage for driving the touch panel, and causes an error in detection of a touch position.

On the contrary, noise is generated due to drive and a read action of the touch panel. The noise is then superimposed on a voltage for driving the display element, appears in a screen displayed by the display element, and has an adverse effect on a display action of the display element.

To solve the problems, PTL 1 discloses the prior art that stops driving a touch panel in a period for driving a display element and drives the touch panel in a period for stopping drive of the display element to drive the display element and the touch panel in a time-division manner.

CITATION LIST

Patent Literature

PTL 1: JP 2009-294903 A (published on Dec. 17, 2009).

SUMMARY

Technical Problem

However, in the related art as mentioned above, drive of the touch panel needs to stop in the period for driving the display element, thereby shortening the period for driving the touch panel to read a linear sum signal. Thus, the number of drive of the touch panel and the number of acquisition of a linear sum signal are reduced. A touch position acquired by equalization becomes more resistant to noise with an increase in number of acquisition of a linear sum signal. However, when drive of the touch panel stops while the display element is driven, the number of drive of the touch panel and the number of acquisition of a linear sum signal are reduced, resulting in a worse SN ratio of touch position data acquired by equalization.

The present invention has been made in view of the above-mentioned problems, and an object thereof is to provide a display module capable of acquiring touch position data with a good SN ratio without affecting a display action of a display element, a touch panel controller, and an electronic device.

Solution to Problem

To solve the above-described problems, a display module according to one aspect of the present invention includes a display element including a plurality of scanning signal lines, a touch panel disposed on a display surface of the display element, and a touch panel controller configured to control the touch panel. The touch panel includes a plurality of signal lines formed in a same direction as that of the scanning signal lines. The touch panel includes a non-drive region and a drive region, the non-drive region moving to correspond to one of the plurality of scanning signal lines selected and driven in order in a display period included in each frame of the display element, the drive region representing a region except for the non-drive region. The touch panel controller includes a drive circuit configured to drive a signal line corresponding to the drive region and stop driving a signal line corresponding to the non-drive region among the plurality of signal lines.

To solve the above-described problems, a touch panel controller according to one aspect of the present invention is a touch panel controller configured to control a touch panel disposed on a display surface of a display element including a plurality of scanning signal lines. The touch panel includes a plurality of drive lines formed in the same direction as that of the scanning signal lines. The touch panel includes a non-drive region and a drive region, the non-drive region moving to correspond to one of the plurality of scanning signal lines selected and driven in order in a display period included in each frame of the display element, the drive region representing a region except for the non-drive region. The touch panel controller includes a drive circuit configured to drive a drive line corresponding to the drive region and stop driving a drive line corresponding to the non-drive region among the plurality of drive lines.

Advantageous Effects of Invention

According to one aspect of the present invention, an effect capable of acquiring touch position data with a good SN ratio without affecting a display action of a display element can be achieved.

BRIEF DESCRIPTION OF DRAWINGS

FIGS. 3A and 3B illustrate a comparative example of a drive code of a drive circuit of the touch panel controller.

FIG. 3A illustrates an example of a drive code driving at two values of +1/−1 and a decoding code. FIG. 3B illustrates an example of a drive code driving at only +1 and a decoding code.

FIGS. 4A and 4B are schematic diagrams for describing a drive action of the touch panel by the touch panel controller. FIG. 4A illustrates a drive action at a time t1. FIG. 4B illustrates a drive action at a subsequent time (t1+Δt).

FIGS. 5A to 5G illustrate an example of the drive code according to the first embodiment. FIGS. 5A to 5G each illustrate an example of a drive code including a factor of "0" corresponding to a non-drive region illustrated in FIGS. 4A and 4B, FIG. 6 is a diagram for describing a complement to capacitance information about a code sequence illustrated in FIG. 5D, FIG. 7A is a diagram for describing another example of the drive code according to the first embodiment. FIG. 7B is a diagram for describing still another example of the drive code.

FIGS. 8A to 8C are diagrams for describing a method for reading a difference between a linear sum signal along one of drive sense lines of the touch panel and a linear sum signal along another one of the drive sense lines. FIG. 8A illustrates an example of reading a difference between the drive sense lines adjacent to each other (next to each other). FIG. 8B illustrates an example of reading a difference between the drive sense lines with one line therebetween. FIG. 8C illustrates an example of reading a difference between the drive sense lines with three lines therebetween.

FIG. 12 is a diagram illustrating an example of a drive code of a drive circuit of the touch panel controller.

DESCRIPTION OF EMBODIMENTS

First Embodiment

A detailed description follows regarding embodiments of the present invention.

Configuration of Display Module 1

Figure 1:
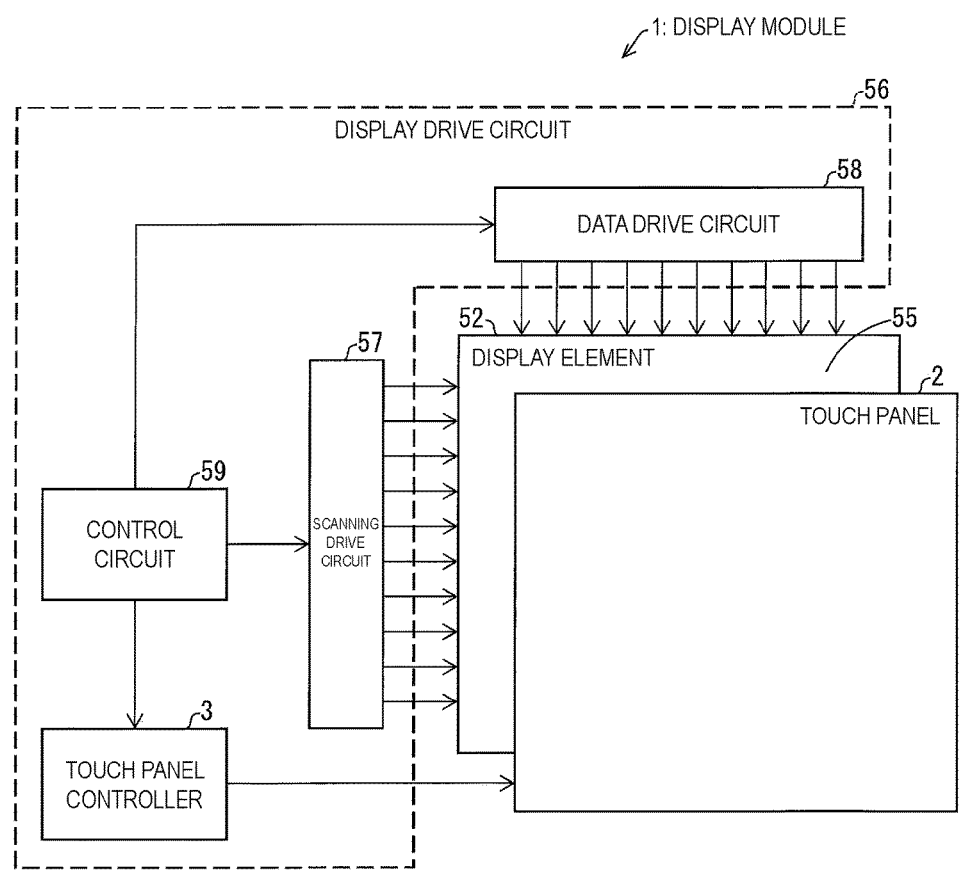
FIG. 1 is a block diagram illustrating a configuration of a display module according to a first embodiment.

FIG. 1 is a block diagram illustrating a configuration of a display module 1 according to a first embodiment. The display module 1 includes a display element 52 including a plurality of scanning signal lines formed in a horizontal direction, a touch panel 2 disposed on a display surface 55 of the display element 52, and a display drive circuit 56 that controls the display element 52 and the touch panel 2. The touch panel 2 includes a plurality of signal lines formed in the same direction as that of the scanning signal lines.

The display drive circuit 56 includes a scanning drive circuit 57 that selects the plurality of scanning signal lines formed in the display element 52 in order, a data drive circuit 58 that supplies a display signal voltage based on video data to a plurality of data signal lines formed in the display element 52, a touch panel controller 3 that controls the touch panel 2, and a control circuit 59 that controls the scanning drive circuit 57, the data drive circuit 58, and the touch panel controller 3.

Figure 2:
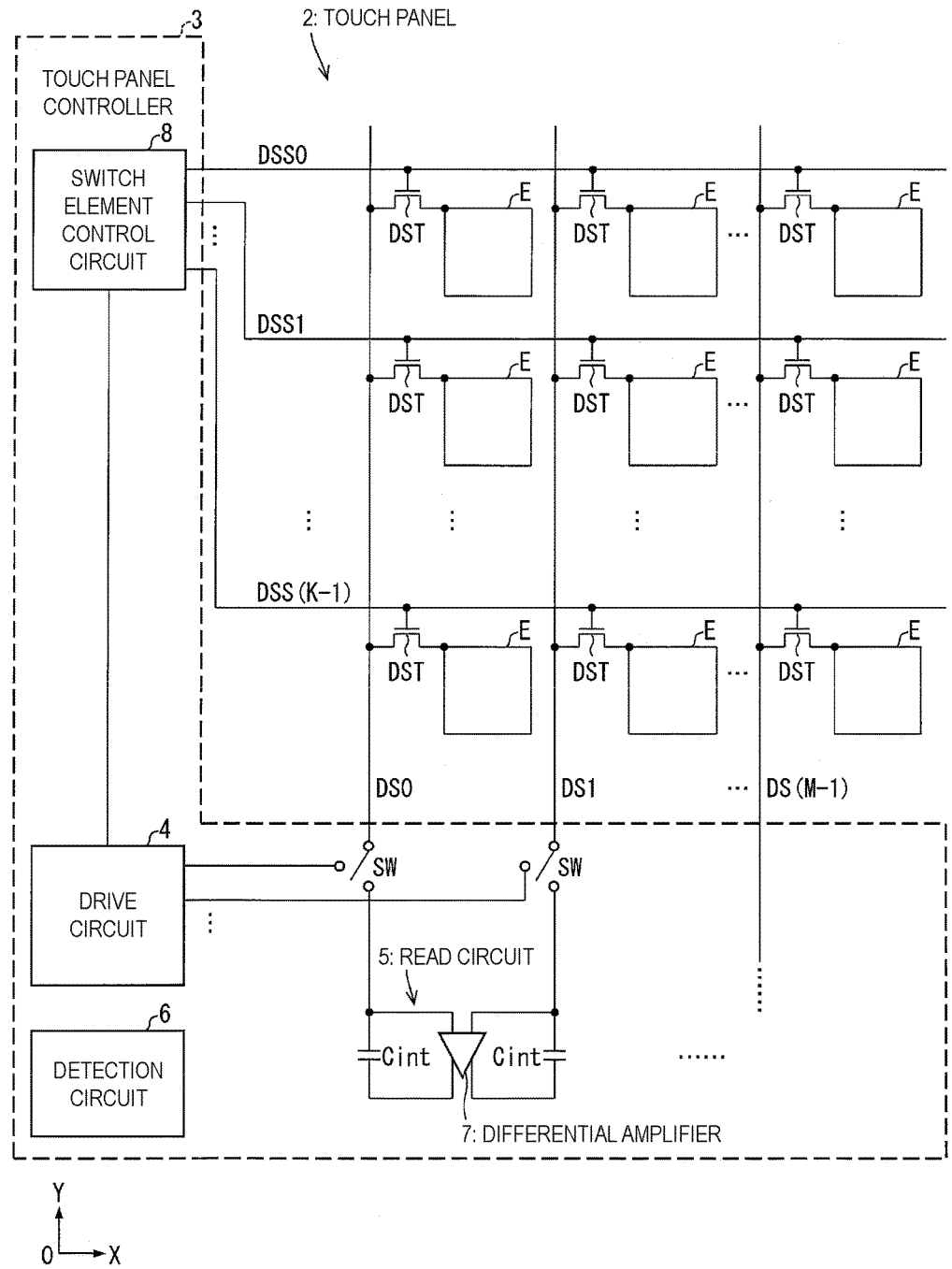
FIG. 2 is a circuit diagram illustrating a configuration of a touch panel and a touch panel controller provided in the display module.

FIG. 2 is a circuit diagram illustrating a configuration of the touch panel 2 and the touch panel controller 3.

The touch panel 2 includes K (where K is plural) control lines DSS0 to DSS(K−1) (control lines) and M (where M is plural) drive sense lines DS0 to DS(M−1) (signal lines) intersecting each other. The touch panel 2 also includes (K×M) detection electrodes E (electrodes) that correspond to intersections of the K control lines DSS0 to DSS(K−1) and the M drive sense lines DS0 to DS(M−1) and that are arranged in matrix.

A drive sense switch element DST (switch element) is formed between each of the detection electrodes E and the corresponding drive sense line. The drive sense switch element DST is formed of a transistor. A gate of each of the drive sense switch elements DST is coupled to the corresponding control line.

The touch panel 2 is provided for detecting a capacitance or a change in capacitance between each of the detection electrodes E and a detected subject such as a finger and a pen.

The touch panel controller 3 includes a drive circuit 4 connected to the M drive sense lines DS0 to DS(M−1) via switching switches SW, a switch element control circuit 8 connected to the K control lines DSS0 to DSS(K−1), a plurality of read circuits 5 connected to the drive sense lines adjacent to each other, and a detection circuit 6 that detects a capacitance or a change in capacitance between each of the detection electrodes E and the detected subject on the basis of an output of each of the read circuits 5.

Each of the read circuits 5 includes a differential amplifier 7 that amplifies a difference between outputs of the drive sense lines adjacent to each other and a pair of integral capacitances Cint provided between one input and one output of the differential amplifier 7 and between another input and another output thereof. Note that each of the read circuits 5 may include a switch that short-circuits one terminal and the other terminal of the integral capacitances Cint and resets a state of the differential amplifier 7 (not illustrated).

Action of Touch Panel System 1

The touch panel system 1 formed as described above works as follows.

First, the switch element control circuit 8 turns on the drive sense switch element DST selected among the (K×M) drive sense switch elements DST on the basis of a factor "1" of a code sequence of K rows and N columns via the K control lines DSS0 to DSS(K−1). At this time, the drive sense switch elements DST that are not selected are off. The switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E at a predetermined potential with +V (for example, power source voltage) through the selected drive sense switch element DST (first drive step).

Next, the switch element control circuit 8 turns on the drive sense switch element DST selected among the (K×M) drive sense switch elements DST on the basis of a factor "−1" of the code sequence of K rows and N columns via the K control lines DSS0 to DSS(K−1). At this time, the drive sense switch elements DST that are not selected are off. Herein, the switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with −V (for example, ground voltage) through the selected drive sense switch element DST (second drive step).

Next, the switch element control circuit 8 turns off the (K×M) drive sense switch elements DST via the K control lines DSS0 to DSS(K−1) and brings each of the detection electrodes E into a floating state. The switching switches SW also switch in such a way to connect the read circuits 5 and the M drive sense lines DS0 to DS(M−1). Subsequently, the switch element control circuit 8 turns on the (K×M) drive sense switch elements DST via the K control lines DSS0 to DSS(K−1).

Each of the read circuits 5 amplifies a difference between linear sum signals based on an electric charge of each of the detection electrodes E read along the adjacent drive sense line via the drive sense switch element DST turning on (read step). Next, the detection circuit 6 detects a capacitance or a change in capacitance between each of the detection electrodes E of the touch panel 2 and a detected subject on the basis of a sum-of-product computation performed on the difference between the linear sum signals output from each of the read circuits 5 and the code sequence. Subsequently, the detection circuit 6 detects a position of the detected subject on the touch panel 2 on the basis of the detected capacitance or the detected change in capacitance (detection step).

Comparative Example of Code Sequence

FIGS. 3A and 3B illustrate a comparative example of a drive code (code sequence) of the switch element control circuit 8 of the touch panel controller 3. FIG. 3A illustrates an example of a drive code driving at two values of +1/−1 and a decoding code. FIG. 3B illustrates an example of a drive code driving at only +1 and a decoding code.

With reference to FIG. 3A, a code sequence M1 of an M sequence for driving seven control lines DSS0 to DSS(K−1) at two values of "+1" and "−1" by the switch element control circuit 8, a code sequence M1$t$ used for a sum-of-product computation with a linear sum signal for decoding the detection circuit 6 and formed by transposing the code sequence M1, and a code sequence M3 being a result of the sum-of-product computation performed on the code sequence M1 and the code sequence M1$t$ are illustrated.

With reference to FIG. 3B, a code sequence M2 for driving control lines DSS0 to DSS(6) at only "+1" by the switch element control circuit 8, the code sequence M1$t$ used for a sum-of-product computation with a linear sum signal for decoding in the detection circuit 6 and formed by transposing the code sequence M1, and a code sequence M4 being a result of the sum-of-product computation performed on the code sequence M2 and the code sequence M1$t$ are illustrated.

Non-Drive Region R1 and Drive Region R2

FIGS. 4A and 4B are schematic diagrams for describing a drive action of the touch panel 2 by the touch panel controller 3. FIG. 4A illustrates a drive action at a time t1. FIG. 4B illustrates a drive action at a subsequent time (t1+Δt).

In the first drive step and the second drive step mentioned above, when the switch element control circuit 8 drives the control lines DSS0 to DSS(K−1) on the basis of the code sequence in a display period included in each frame of the display element 52, noise is generated due to the drive of the control lines and is superimposed on a voltage for driving the display element 52. The noise then appears in a screen displayed by the display element 52 and has an adverse effect on a display action of the display element 52. In a case where the display element 52 and the touch panel 2 are driven in a time-division manner as described in PTL 1 to avoid the adverse effect, the number of drive of the touch panel 2 and the number of acquisition of a linear sum signal are reduced, resulting in a worse SN ratio of touch position data acquired by equalization.

Thus, in the present embodiment, as illustrated in FIG. 4A, the touch panel 2 includes a non-drive region R1 and a drive region R2. The non-drive region R1 moves so as to correspond to one of the plurality of scanning signal lines corresponding to an arrow A1 selected and driven in order in a display period included in each frame of the display element 52. The drive region R2 represents a region except for the non-drive region R1. Then, at a time t1, the switch element control circuit 8 of the touch panel controller 3 drives a control line corresponding to the drive region R2 and stops driving a control line corresponding to the non-drive region R1 among the control lines DSS0 to DSS(K−1).

As illustrated in FIG. 4B, at a time t2=T1+Δt, a scanning signal line corresponding to an arrow A2 located below the arrow A1 is selected, and the non-drive region R1 moves downward. The switch element control circuit 8 drives a control line corresponding to the drive region R2 except for the non-drive region R1 that has moved downward and stops driving a control line corresponding to the non-drive region R1 that has moved downward.

Specific Example of Code Sequence

FIGS. 5A to 5G illustrate an example of the drive code according to the first embodiment. FIGS. 5A to 5G each illustrate an example of a drive code including a factor of "0" corresponding to the non-drive region R1 illustrated in FIGS. 4A and 4B.

To make description clear and simple, description is given by taking an example in which the plurality of scanning signal lines of the display element 52 are seven scanning signal lines and K control lines DSS0 to DSS(K−1) of the touch panel 2 are seven control lines DSS0 to DSS6.

First, when a first scanning signal line located uppermost in the display element 52 is selected and driven, the switch element control circuit 8 drives the seven control lines DSS0 to DSS6 in parallel on the basis of a code sequence M1$a$ in which all factors in a first line corresponding to the first control line DSS0 disposed above the first scanning signal line are replaced with "0". Next, when a second scanning signal line from the top is selected and driven, the switch element control circuit 8 drives the seven control lines DSS0 to DSS6 in parallel on the basis of a code sequence M1*b* in which all factors in a second line corresponding to the second control line DSS1 disposed above the second scanning signal line are replaced with "0".

Then, when a third scanning signal line is selected, the switch element control circuit 8 drives the control lines DSS0 to DSS6 on the basis of a code sequence M1*c* in which all factors in a third line are replaced with "0". The same applies hereinafter. When a fourth scanning signal line is selected, the control lines are driven on the basis of a code sequence M1*d* in which all factors in a fourth line are replaced with "0", and when a fifth scanning signal line is selected, the control lines are driven on the basis of a code sequence M1*e*. When a sixth scanning signal line is selected, the control lines are driven on the basis of a code sequence M1*f*, and when a seventh scanning signal line is selected, the control lines are driven on the basis of a code sequence M1*g*.

The scanning signal lines and the control lines may vary in number. A factor in a code sequence for driving a control line corresponding to a selected scanning signal line may be replaced with "0". A control line corresponding to a selected scanning signal line is not limited to one and may include a plurality of control lines adjacent to each other.

Figure 6:
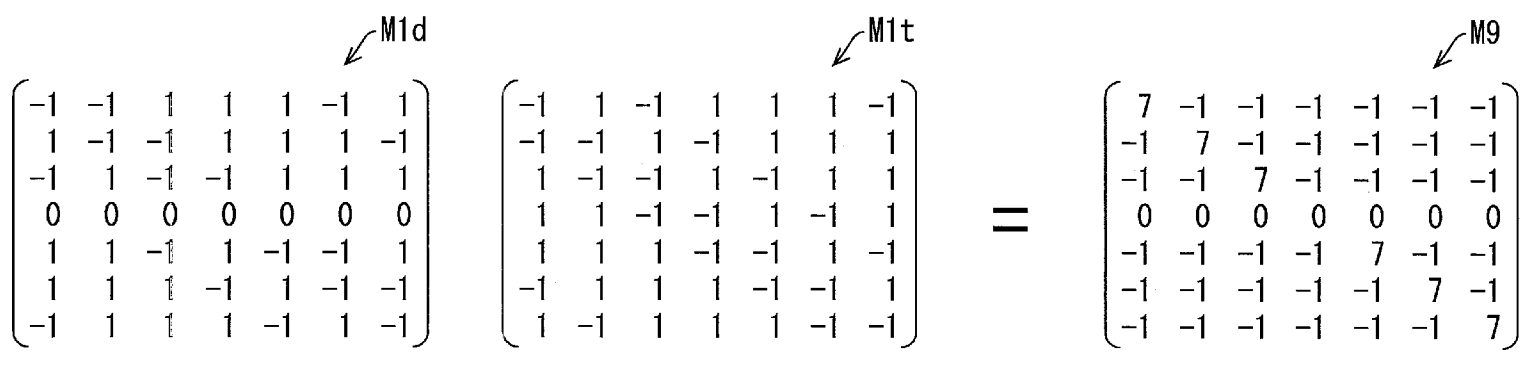

FIG. 6 is a diagram for describing a complement to capacitance information about the code sequence M1*d* illustrated in FIG. 5D.

In the code sequences M1*a* to M1*g* illustrated in FIG. 5, factors in a predetermined row are always "0". For example, factors in a fourth row in the code sequence M1*d* of FIG. 5D are always "0". Thus, when the control lines DSS0 to DSS6 are driven on the basis of the code sequence M1*d*, an electrode E relating to the control line DSS3 corresponding to the factors in the fourth row is not driven, so that capacitance information about the electrode E corresponding to the control line DSS3 cannot be obtained. As described above with FIG. 5, when the first scanning signal line is selected, the control lines are driven on the basis of the code sequence M1*a* in which all factors in the first line are replaced with "0". When the second scanning signal line is selected, the control lines are driven on the basis of the code sequence M1*b*. When the third scanning signal line is selected, the control lines are driven on the basis of the code sequence M1*c*. When the fourth scanning signal line is selected, the control lines are driven on the basis of the code sequence M1*d*. In this case, for example, capacitance information is reused by copying capacitance information about the electrode E corresponding to the control line DSS3 obtained when being driven by the code sequence M1*c* in which the factors in the fourth row are not always "0" immediately before the code sequence M1*d* in which the factors in the fourth row are always "0" to capacitance information about the electrode E corresponding to the control line DSS3 when being driven by the code sequence M1*d* in which the factors in the fourth row are always "0". This can complement capacitance information that cannot be obtained because factors are always "0".

Specific Example of Another Code Sequence

Figures 7A, 7B:
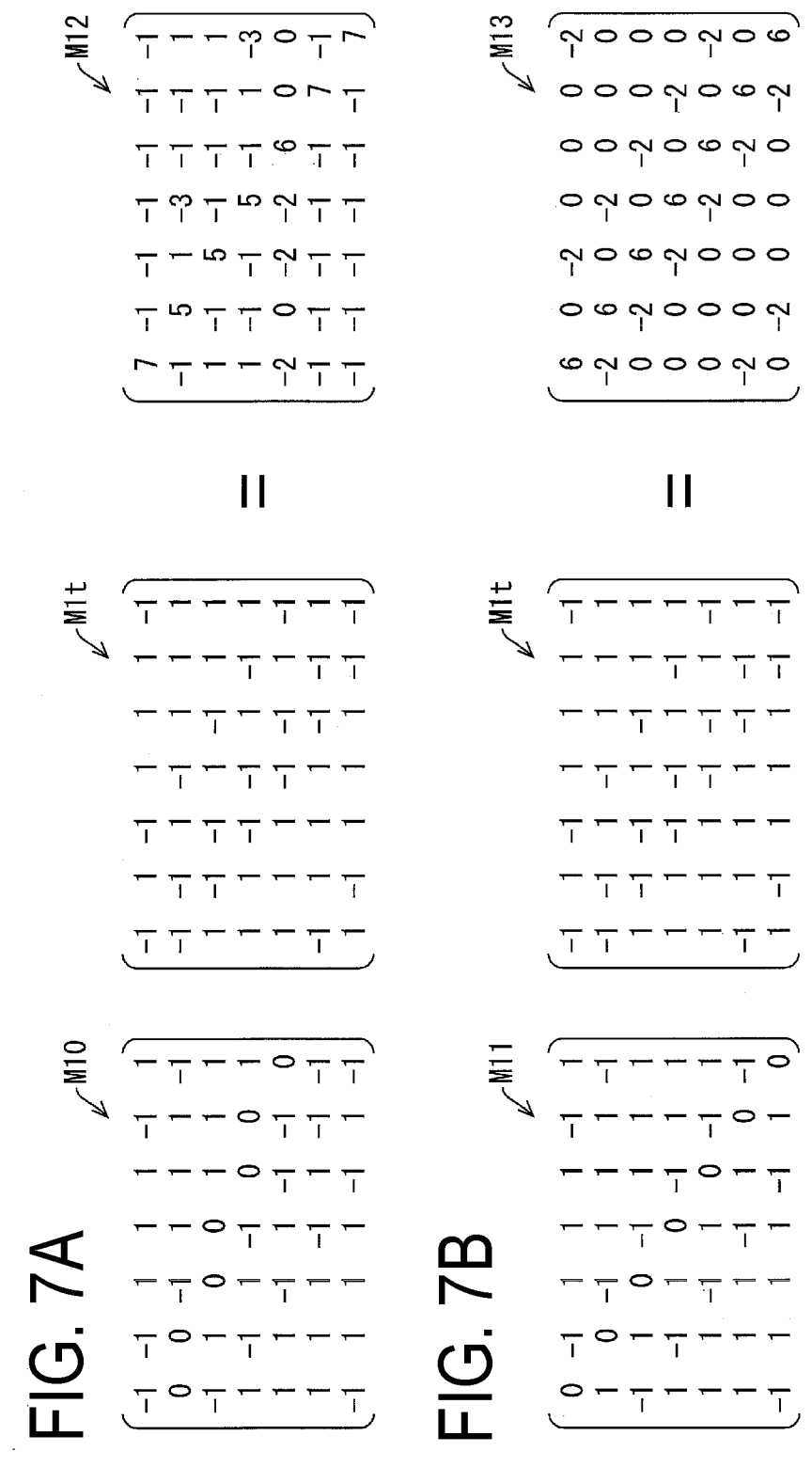

FIG. 7A is a diagram for describing another example of the drive code according to the first embodiment. FIG. 7B is a diagram for describing still another example of the drive code.

With reference to FIG. 7A, a code sequence M10 being another example of the code sequence, a code sequence M1*t* formed by transposing the code sequence M1 illustrated in FIG. 3A, and a code sequence M12 being a result of a sum-of-product computation performed on the code sequence M10 and the code sequence M1*t* are illustrated.

Factors in the same row do not need to be always "0" in the code sequence according to the first embodiment as in the code sequences M1*a* to M1*g* illustrated in FIGS. 5A to 5G. The code sequence M10 is a code sequence in which factors in a second row of first and second columns are replaced with "0", factors in a third row of third and fourth columns are replaced with "0", factors in a fourth row of fifth and sixth columns are replaced with "0", and a factor in a fifth row of a seventh column is replaced with "0" in the code sequence M1 illustrated in FIG. 3A.

An action of the display module 1 by the code sequence M10 is described. First, when the control lines DSS0 to DSS6 are driven by the first and second columns in the code sequence M10, the scanning drive circuit 57 (FIG. 1) selects and drives a scanning signal line of the display element 52 disposed below the second control line DSS1 corresponding to the second row having the factors being "0". A region of the touch panel corresponding to the control line DSS1 becomes the non-drive region R1, and the other region of the touch panel becomes the drive region R2.

Then, when the control lines DSS0 to DSS6 are driven by the third and fourth columns in the code sequence M10, the scanning drive circuit 57 (FIG. 1) selects and drives a scanning signal line disposed below the third control line DSS2 corresponding to the third row having the factors being "0". A region of the touch panel corresponding to the control line DSS2 becomes the non-drive region R1, and the other region of the touch panel becomes the drive region R2. Next, when the control lines DSS0 to DSS6 are driven by the fifth and sixth columns in the code sequence M10, the scanning drive circuit 57 (FIG. 1) selects and drives a scanning signal line disposed below the fourth control line DSS3 corresponding to the fourth row having the factors being "0". Then, when the control lines DSS0 to DSS6 are driven by the seventh column in the code sequence M10, the scanning drive circuit 57 (FIG. 1) selects and drives a scanning signal line disposed below the fifth control line DSS4 corresponding to the fifth row having the factor being "0".

With reference to FIG. 7B, a code sequence M11 being still another example of the code sequence, the code sequence M1*t* formed by transposing the code sequence M1 illustrated in FIG. 3A, and a code sequence M13 being a result of a sum-of-product computation performed on the code sequence M11 and the code sequence M1*t* are illustrated.

The code sequence M11 is a code sequence in which factors in a first row of a first column, a second row of a second column, a third row of a third column, a fourth row of a fourth column, a fifth row of a fifth column, a sixth row of a sixth column, and a seventh row of a seventh column are replaced with "0" in the code sequence M1 illustrated in FIG. 3A.

An action of the display module 1 by the code sequence M11 is described. First, when the control lines DSS0 to DSS6 are driven by the first column in the code sequence M11, the scanning drive circuit 57 (FIG. 1) selects and drives a scanning signal line of the display element 52 disposed below the first control line DSS0 corresponding to the first row having the factor being "0". A region of the touch panel corresponding to the control line DSS0 becomes the non-drive region R1, and the other region of the touch panel becomes the drive region R2.

Then, when the control lines DSS0 to DSS6 are driven by the second column in the code sequence M11, the scanning drive circuit 57 (FIG. 1) selects and drives a scanning signal line disposed below the second control line DSS1 corresponding to the second row having the factor being "0". A region of the touch panel corresponding to the control line DSS1 becomes the non-drive region R1, and the other region of the touch panel becomes the drive region R2. Next, when the control lines DSS0 to DSS6 are driven by the third column in the code sequence M11, the scanning drive circuit 57 (FIG. 1) selects and drives a scanning signal line disposed below the third control line DSS2 corresponding to the third row having the factor being "0". Then, when the control lines DSS0 to DSS6 are driven by the fourth column in the code sequence M1, the scanning drive circuit 57 (FIG. 1) selects and drives a scanning signal line disposed below the fourth control line DSS3 corresponding to the fourth row having the factor being "0". The same applies hereinafter, and the control lines DSS0 to DSS6 are driven by the fifth column to the seventh column in the code sequence M11.

Specific Example of Differential Reading

FIGS. 8A to 8C are diagrams for describing a method for reading a difference between a linear sum signal along one of the drive sense lines of the touch panel 2 provided in the touch panel system 1 and a linear sum signal along another one of the drive sense lines. FIG. 8A illustrates an example of reading a difference between the drive sense lines adjacent to each other (next to each other). FIG. 8B illustrates an example of reading a difference between the drive sense lines with one line therebetween. FIG. 8C illustrates an example of reading a difference between the drive sense lines with three lines therebetween.

With reference to FIG. 8A, an example of reading 32 drive sense lines DS0 to DS31 by 16 read circuits AFE0 to AFE15 is illustrated. The read circuits AFE0 to AFE15 each have the same configuration as that of the read circuit 5 illustrated in FIG. 2.

First, at a timing phase 0, the read circuit AFE0 amplifies a difference between a linear sum signal from the drive sense line DS1 and a linear sum signal from the drive sense line DS0. Then, the read circuit AFE1 amplifies a difference between the drive sense line DS3 and the drive sense line DS2, and the read circuit AFE2 amplifies a difference between the drive sense line DS5 and the drive sense line DS4. Hereinafter, the read circuits AFE3 to AFE15 similarly amplify a difference between the adjacent drive sense lines.

At a next timing phase 1, the read circuit AFE0 amplifies a difference between the drive sense line DS2 and the drive sense line DS1. Then, the read circuit AFE1 amplifies a difference between the drive sense line DS4 and the drive sense line DS3, and the read circuit AFE2 amplifies a difference between the drive sense line DS6 and the drive sense line DS5. Hereinafter, the read circuits AFE3 to AFE14 similarly amplify a difference between the adjacent drive sense lines.

In the example illustrated in FIGS. 2 and 8A, the example in which the read circuit differentially amplifies the adjacent drive sense lines is illustrated. However, the present invention is not limited thereto. The sense lines that are not adjacent to each other with a plurality of lines therebetween may be differentially amplified.

FIG. 8B illustrates an example of reading a difference between the drive sense lines with one line therebetween.

First, at a timing phase 0, the read circuit AFE0 amplifies a difference between the drive sense line DS2 and the drive sense line DS0. Then, the read circuit AFE1 amplifies a difference between the drive sense line DS3 and the drive sense line DS1, and the read circuit AFE2 amplifies a difference between the drive sense line DS6 and the drive sense line DS4. Hereinafter, the read circuits AFE3 to AFE15 similarly amplify a difference between the drive sense lines with one line therebetween.

At a next timing phase 1, the read circuit AFE0 amplifies a difference between the drive sense line DS4 and the drive sense line DS2. Then, the read circuit AFE1 amplifies a difference between the drive sense line DS5 and the drive sense line DS3, and the read circuit AFE2 amplifies a difference between the drive sense line DS8 and the drive sense line DS6. Hereinafter, the read circuits AFE3 to AFE13 similarly amplify a difference between the drive sense lines with one line therebetween.

FIG. 8C illustrates an example of reading a difference between the drive sense lines with three lines therebetween.

First, at a timing phase 0, the read circuit AFE0 amplifies a difference between the drive sense line DS4 and the drive sense line DS0. Then, the read circuit AFE1 amplifies a difference between the drive sense line DS5 and the drive sense line DS1, and the read circuit AFE2 amplifies a difference between the drive sense line DS6 and the drive sense line DS2. Hereinafter, the read circuits AFE3 to AFE15 similarly amplify a difference between the drive sense lines with three lines therebetween.

At a next timing phase 1, the read circuit AFE0 amplifies a difference between the drive sense line DS8 and the drive sense line DS4. Then, the read circuit AFE1 amplifies a difference between the drive sense line DS9 and the drive sense line DS5, and the read circuit AFE2 amplifies a difference between the drive sense line DS10 and the drive sense line DS6. Hereinafter, the read circuits AFE3 to AFE11 similarly amplify a difference between the drive sense lines with three lines therebetween.

By such differential reading that reads a difference between the drive sense lines, noise on one of the drive sense lines and noise on the other drive sense line can cancel each other by subtraction, so that the touch panel system resistant to noise can be formed.

A difference is read between the drive sense lines in the differential reading, which results in a decreased value of a read signal. Thus, the differential reading is advantageous in that a gain of the differential amplifier 7 can be increased more than a gain in a case of single reading.

Figures 9, 10:
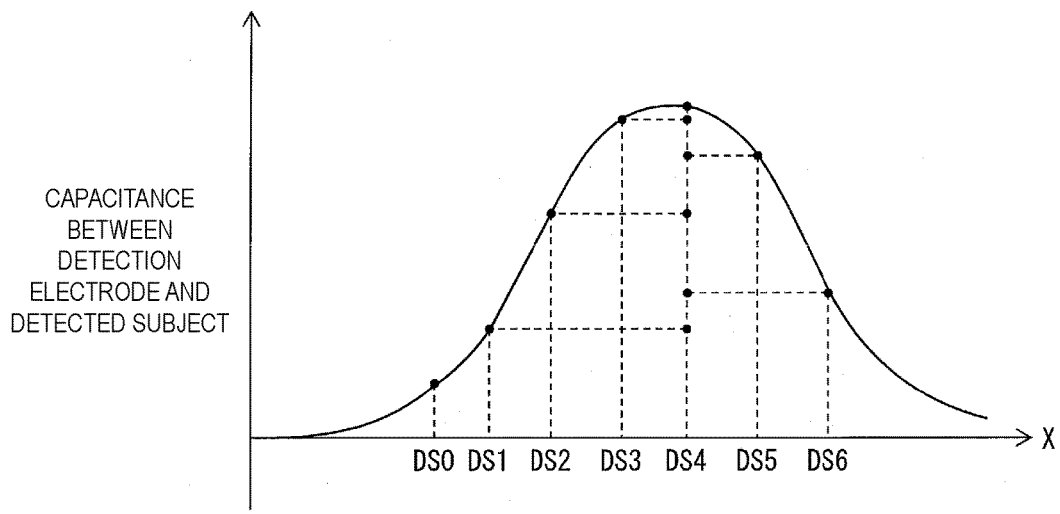
FIG. 9 is a graph showing capacitance distribution between a detection electrode corresponding to each of the drive sense lines and a detected subject.
FIG. 10 is a diagram for describing a method for reading a difference between a linear stun signal based on a group including the plurality of drive sense lines and another linear sum signal based on another group including the other plurality of drive sense lines.

FIG. 9 is a graph showing capacitance distribution between the detection electrode E corresponding to each of the drive sense lines and a detected subject.

In a hover operation operated by a detected subject such as a finger slightly away from the touch panel 2, distribution of a capacitance between the detection electrode E and the detected subject in a plane direction of the touch panel 2 is distribution as shown in FIG. 9.

A signal in which a difference between linear sum signals from the adjacent drive sense lines is amplified has a small value, but an obtained value of the differential signal can be increased as shown in FIG. 9 by positioning the drive sense lines having a difference amplified away from each other as illustrated in FIGS. 8B and 8C.

FIG. 10 is a diagram for describing a method for reading a difference between a linear sum signal based on a group including the plurality of drive sense lines and another linear sum signal based on another group including the other plurality of drive sense lines.

The above-mentioned embodiment illustrates the example of reading a difference between the linear sum signal along one of the drive sense lines and the other linear sum signal along the other drive sense line. However, the present invention is not limited thereto. A difference may be read between a linear sum signal based on a group including the plurality of drive sense lines and another linear sum signal based on another group including the other plurality of drive sense lines.

FIG. 10 illustrates an example of making a group of a $(2n)^{th}$ drive sense line and a $(2n+1)^{th}$ drive sense line and reading a difference between grouped drive sense line groups.

First, at a timing phase 0, the drive sense lines DS3 and DS2 are formed into a group, and the drive sense lines DS1 and DS0 are formed into a group. Then, the read circuit AFE0 amplifies a difference between a sum of a linear sum signal from the drive sense line DS3 and a linear sum signal from the drive sense line DS2 and a sum of a linear sum signal from the drive sense line DS1 and a linear sum signal from the drive sense line DS0. The drive sense lines DS7 and DS6 are formed into a group, and the drive sense lines DS5 and DS4 are formed into a group. Then, the read circuit AFE1 amplifies a difference between a sum of a linear sum signal from the drive sense line DS7 and a linear sum signal from the drive sense line DS6 and a sum of a linear sum signal from the drive sense line DS5 and a linear sum signal from the drive sense line DS4. The drive sense lines DS11 and DS10 are formed into a group, and the drive sense lines DS9 and DS8 are formed into a group. Then, the read circuit AFE2 amplifies a difference between a sum of the drive sense line DS11 and the drive sense line DS10 and a sum of the drive sense line DS9 and the drive sense line DS8. Hereinafter, the read circuits AFE3 to AFE7 similarly amplify a difference between the grouped drive sense line groups.

At a next timing phase 1, the drive sense lines DS5 and DS4 are formed into a group, and the drive sense lines DS3 and DS2 are formed into a group. Then, the read circuit AFE0 amplifies a difference between a sum of a linear sum signal from the drive sense line DS5 and a linear sum signal from the drive sense line DS4 and a sum of a linear sum signal from the drive sense line DS3 and a linear sum signal from the drive sense line DS2. The drive sense lines DS9 and DS8 are formed into a group, and the drive sense lines DS7 and DS6 are formed into a group. Then, the read circuit AFE1 amplifies a difference between a sum of a linear sum signal from the drive sense line DS9 and a linear sum signal from the drive sense line DS8 and a sum of a linear sum signal from the drive sense line DS7 and a linear sum signal from the drive sense line DS6. The drive sense lines DS13 and DS12 are formed into a group, and the drive sense lines DS11 and DS10 are formed into a group. Then, the read circuit AFE2 amplifies a difference between a sum of the drive sense line DS13 and the drive sense line DS12 and a sum of the drive sense line DS11 and the drive sense line DS10. Hereinafter, the read circuits AFE3 to AFE6 similarly amplify a difference between the grouped drive sense line groups.

The differential reading reads a difference component between the drive sense lines, so that only a small signal can be acquired. However, as described above, the drive sense lines are brought together into a group and then read, so that a signal component read from the drive sense lines can be increased.

Note that the above-mentioned embodiment illustrates the example of turning on the drive sense switch elements DST via all the control lines DSS0 to DSS(K−1) and driving the drive sense lines DS0 to DS(M−1), but the present invention is not limited thereto. The switch element control circuit 8, the drive circuit 4, and the switching switches SW may form so as to turn on the drive sense switch elements DST for at least two of the control lines and drive the drive sense lines DS0 to DS(M−1).

Second Embodiment

Figure 11:
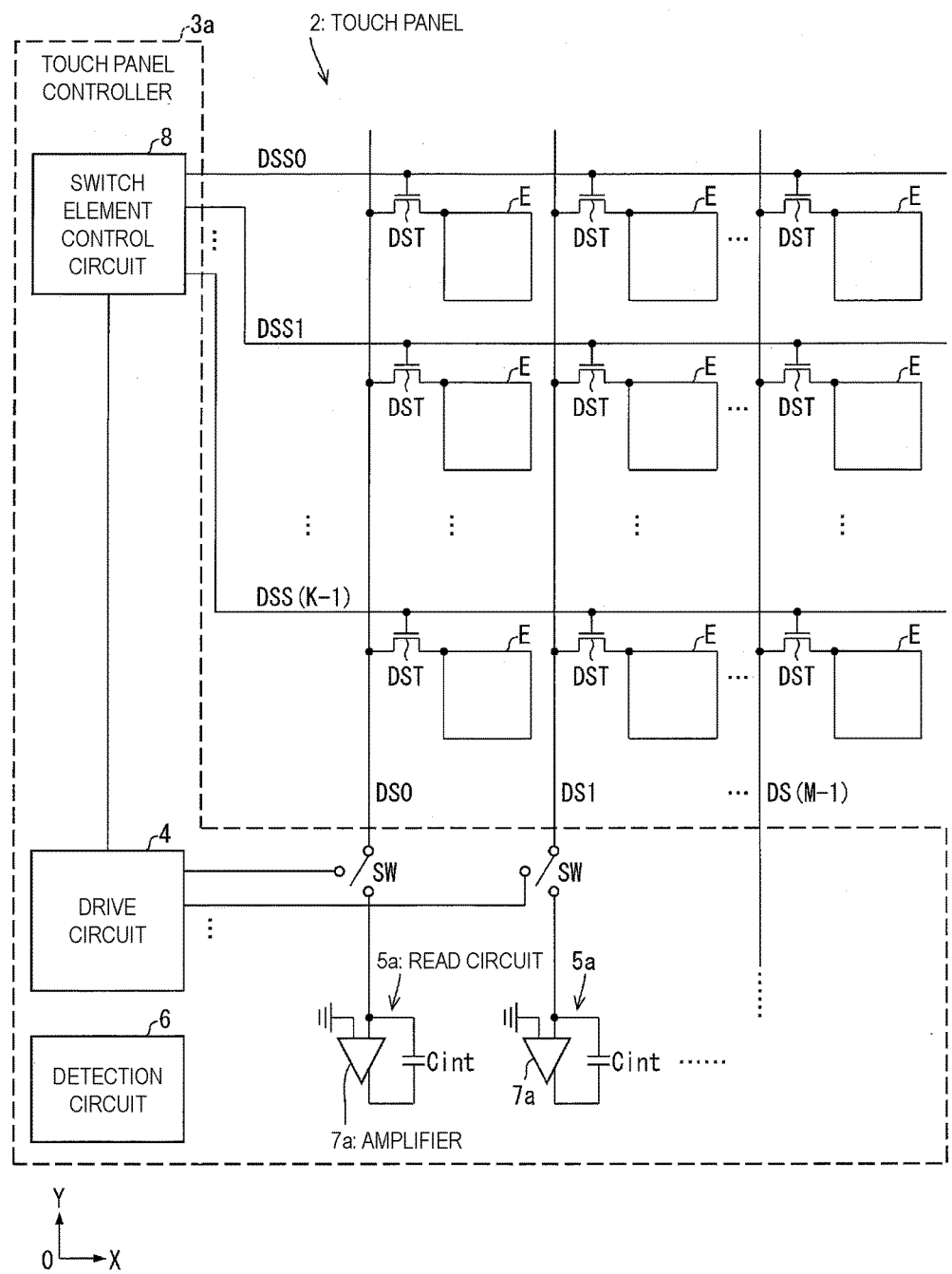
FIG. 11 is a circuit diagram illustrating a configuration of a touch panel and a touch panel controller provided in a display module according to a second embodiment.
Figure 12:
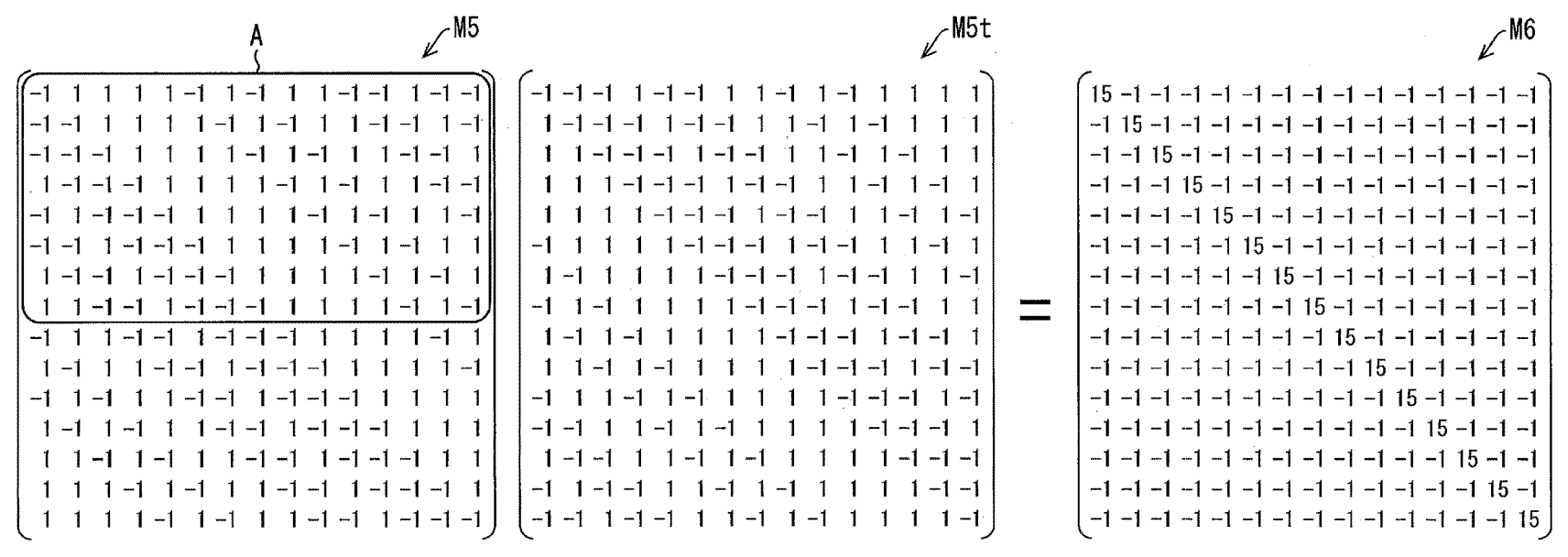

A description follows regarding another embodiment of the present invention, with reference to FIGS. 11 to 13. Note that members having the same function as the members stated in the embodiment above are appended with the same reference signs for the sake of description, and the description thereof is omitted.

FIG. 11 is a circuit diagram illustrating a configuration of a touch panel 2 and a touch panel controller 3a according to a second embodiment. The touch panel controller 3a performs single reading on a drive sense line.

The touch panel controller 3a includes M read circuits 5a. Each of M drive sense lines DS0 to DS(M−1) is connected to one of inputs of an amplifier 7a of the corresponding read circuit 5a. Another input of the amplifier 7a is AC grounded. An integral capacitance Cint is connected between the one input and an output of the amplifier 7a. Note that each of the read circuits 5a may include a switch that short-circuits one terminal and the other terminal of the integral capacitance Cint and resets a state of the amplifier 7a (not illustrated).

The single reading reads an absolute value of a capacitance instead of a difference component of a capacitance. Thus, the single reading is advantageous in that a value of a linear sum signal is greater than that in the differential reading, but the amplifier is more likely to be saturated.

Also, in the second embodiment illustrated in FIG. 11 as in the first embodiment, the touch panel 2 includes a non-drive region R1 (FIGS. 4A and 4B) and a drive region R2. The non-drive region R1 moves so as to correspond to one of the plurality of scanning signal lines selected and driven in order in a display period included in each frame of the display element 52 (FIG. 1). The drive region R2 represents a region except for the non-drive region R1. A switch element control circuit 8 then drives a control line corresponding to the drive region R2 and stops driving a control line corresponding to the non-drive region R1 among the plurality of control lines on the basis of the code sequences M1a to M1g illustrated in FIGS. 5A to 5G, for example.

FIG. 12 is a diagram illustrating an example of a drive code (code sequence) of a drive circuit 4 of the touch panel controller 3a.

FIG. 12 illustrates a code sequence M5 of 15 rows and 15 columns of an M sequence when driving at two values of a factor "+1" for allowing the drive circuit 4 to drive the drive sense line from a reference potential to a power source potential and a factor "−1" for allowing the drive circuit 4 to drive the drive sense line from a reference potential to a ground potential, a code sequence M5t used for a sum-of-product computation for decoding in a detection circuit 6 and formed by transposing the code sequence M5, and a code sequence M6 being a result of the sum-of-product computation performed on the code sequence M5 and the code sequence M5t.

Eight control lines are driven on the basis of a code sequence A of eight rows and 15 columns surrounded by a frame illustrated in FIG. 12 in the code sequence M5.

The number of factors "1" is three and the number of factors "−1" is five in a first column from the left in the code sequence A, and thus a difference between them in number is two. The number of factors "1" is three and the number of factors "−1" is five in a second column to a third column similarly from the left, and thus a difference between them in number is two. The number of factors "1" is four and the number of factors "−1" is four in a fourth column from the left, and thus there is no difference between them in number. The number of factors "1" is six and the number of factors "−1" is two in a ninth column to a tenth column from the left, and thus a difference between them in number is four.

In this way, a difference between the number of factors "1" and the number of factors "−1" in each of the columns in the code sequence A varies from zero to four and is unbalanced.

On the other hand, in the code sequence M1 of the M sequence of seven rows and seven columns described above with FIG. 3A, the number of the factor "1" is four and the number of the factor "−1" is three in each of the first column to the seventh column, and thus a difference between them in number is one. Therefore, the code sequence M1 always has mostly good balance between the number of the factor "1" and the number of the factor "−1". Note that the most balanced state is when the number of factors "1" and the number of factors "−1" are the same and a difference between them in number is zero.

Because the code sequence M1 has the seven rows and the seven columns, all of the eight drive sense lines cannot be driven at the same time. However, in a case where the balance between the number of the factor "1" and the number of the factor "−1" in the code sequence is prioritized, there is such an option that the seven drive sense lines DS0 to DS6 are driven by the code sequence M1 at the first timing to obtain capacitance distribution corresponding to the drive sense lines DS0 to DS6, the seven drive sense lines DS1 to DS7 are then driven by the code sequence M1 at the next timing to obtain capacitance distribution corresponding to the drive sense lines DS1 to DS7, and both of the capacitance distributions are combined together to obtain capacitance distribution corresponding to the eight drive sense lines DS0 to DS7.

Figure 13A:
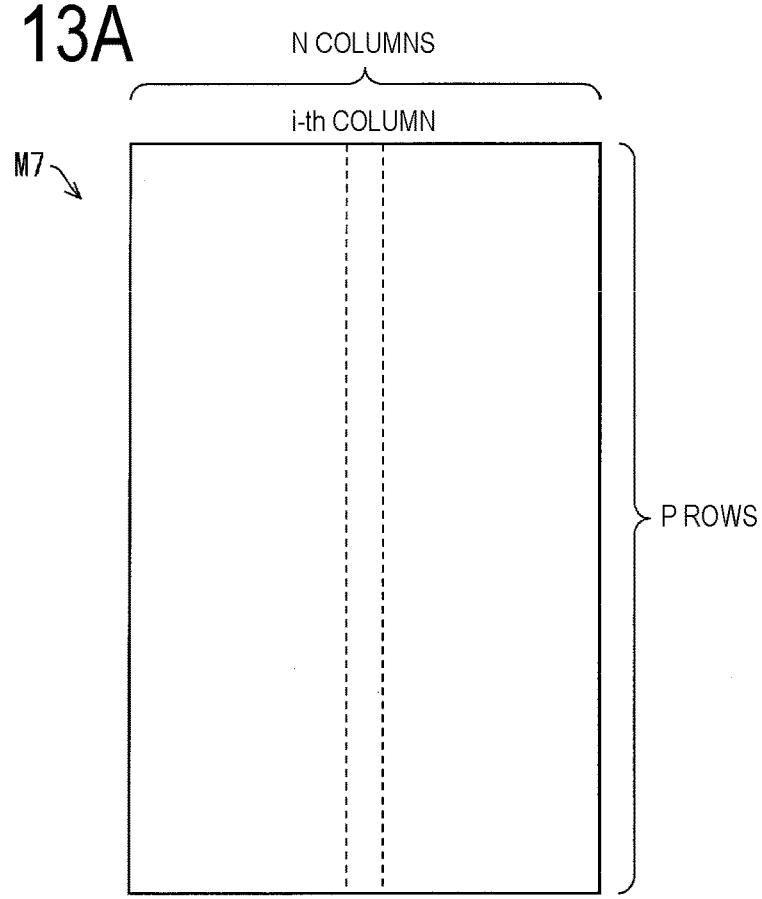
FIGS. 13A and 13B are diagrams illustrating an example of another drive code of the drive circuit.
Figure 13B:
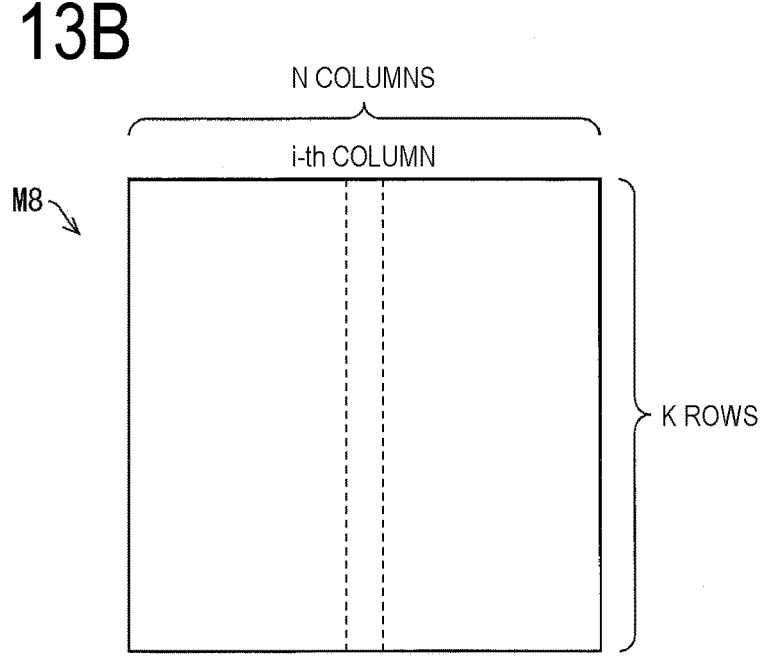

FIGS. 13A and 13B are diagrams illustrating an example of another drive code of the switch element control circuit 8.

A code sequence M8 includes K rows selected from P rows in a code sequence M7 of P rows and N columns including the factor "1" for driving the drive sense line from a reference potential to a power source potential and the factor "−1" for driving the sense line from a reference potential to a ground potential (K≤N, K≤P), and is balanced such that a difference between the number of the factor "1" and the number of the factor "−1" in an $i^{th}$ column (1≤i≤N) in the code sequence is brought closer to zero. On the basis of the code sequence M8, the switch element control circuit 8 drives K control lines DSS0 to DSS(K−1). Also in this way, the control lines can be balanced and driven.

For example, when 16 control lines are driven, the 16 control lines are driven by using the code sequence M8 having 16 rows selected from the code sequence M7 of the M sequence of 64 rows and 64 columns such that a difference between the number of the factor "1" and the number of the factor "−1" in an $i^{th}$ column (1≤i≤N) is brought closer to zero and is balanced. Thus, the control lines can be balanced and driven.

Third Embodiment

Configuration of Touch Panel System 1b

Figure 14:
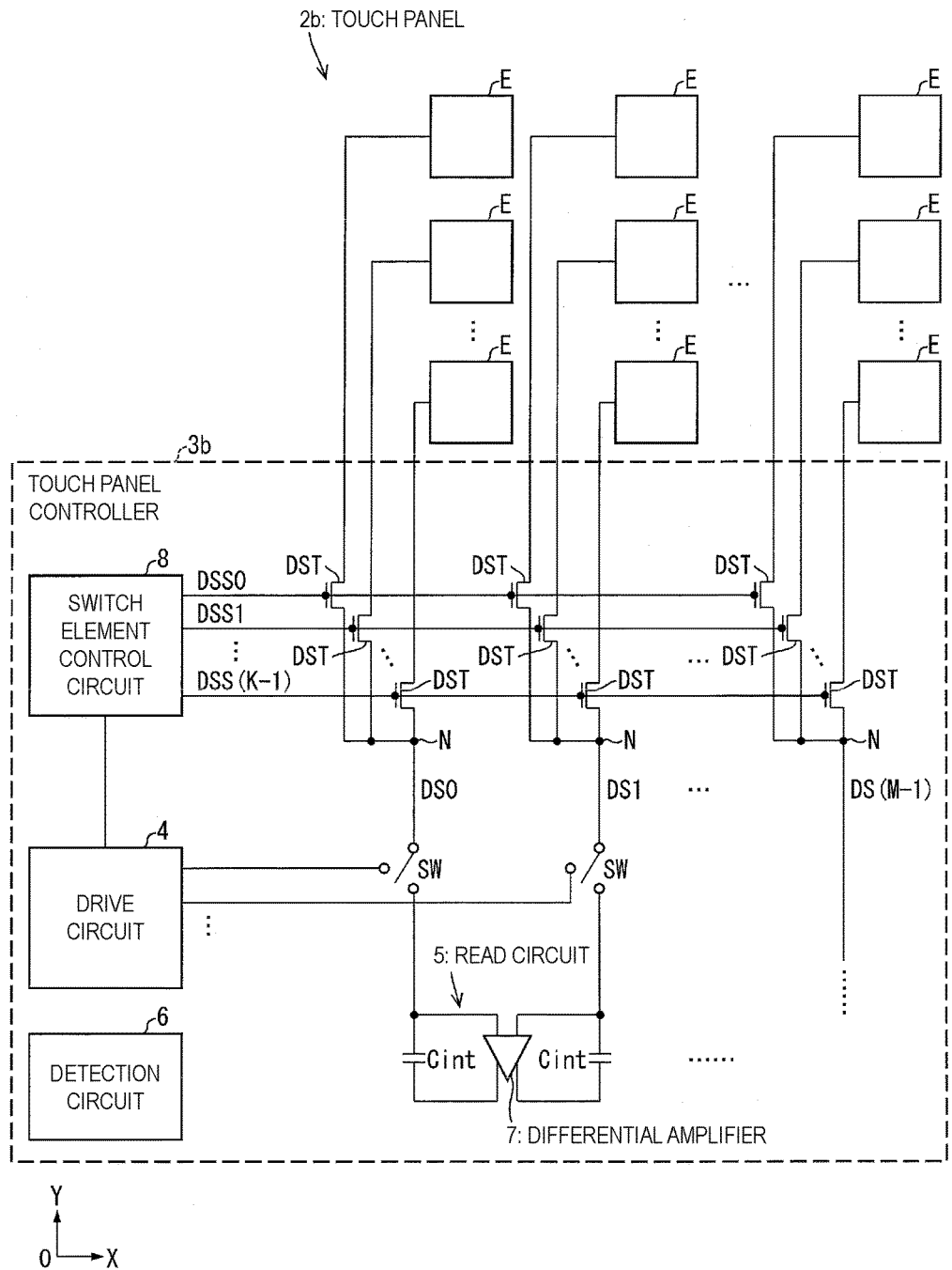
FIG. 14 is a circuit diagram illustrating a configuration of a touch panel and a touch panel controller provided in a display module according to a third embodiment.

FIG. 14 is a circuit diagram illustrating a configuration of a touch panel 2b and a touch panel controller 3b according to a third embodiment of the present invention. Members having the same function as the members stated in the embodiment above are appended with the same reference signs, and the description thereof is omitted.

The touch panel 2b includes (K×M) detection electrodes E (electrodes) arranged in matrix. Herein, an X-axis direction is a first direction of this matrix. A Y-axis direction is a second direction intersecting the first direction of this matrix.

The touch panel controller 3b includes a drive circuit 4 connected to M drive sense lines DS0 to DS(M−1) via switching switches SW, a switch element control circuit 8 connected to K control lines DSS0 to DSS(K−1), a plurality of read circuits 5 connected to the drive sense lines adjacent to each other, a detection circuit 6 that detects a capacitance or a change in capacitance between each of the detection electrodes E and a detected subject on the basis of an output of each of the read circuits 5, and a drive sense switch element DST (switch element).

Each of the read circuits 5 includes a differential amplifier 7 that amplifies a difference between outputs of the drive sense lines adjacent to each other and a pair of integral capacitances Cint provided between one input and one output of the differential amplifier 7 and between another input and another output thereof. Note that each of the read circuits 5 may include a switch that short-circuits one terminal and the other terminal of the integral capacitances Cint and resets a state of the differential amplifier 7 (not illustrated).

The drive sense lines DS0 to DS(M−1) are aligned in the X-axis direction. The plurality of detection electrodes E aligned in one line in the Y direction are connected to a node N via the drive sense switch elements DST and connected to one corresponding drive sense line via the node N.

The control lines DSS0 to DSS(K−1) are aligned in the Y direction. Gates of the plurality of drive sense switch elements DST connected to the plurality of detection electrodes E aligned in one line in the X direction are connected to one corresponding control line.

The touch panel 2b differs from the touch panel 2 in that the touch panel 2b does not include the switch element DST built therein. The touch panel controller 3b differs from the touch panel controllers 3, 3a in that the touch panel controller 3b includes the switch element DST built therein.

Action of Touch Panel System 1b

The touch panel system 1b formed as described above works as follows.

First, the switch element control circuit 8 turns on the drive sense switch element DST selected among the (K×M) drive sense switch elements DST on the basis of a factor "1" of a code sequence of K rows and N columns via the K control lines DSS0 to DSS(K−1). At this time, the drive sense switch elements DST that are not selected are off. The switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E at a predetermined potential with +V (for example, power source voltage) through the selected drive sense switch element DST (first drive step).

Next, the switch element control circuit 8 turns on the drive sense switch element DST selected among the (K×M) drive sense switch elements DST on the basis of a factor "−1" of the code sequence of K rows and N columns via the K control lines DSS0 to DSS(K−1). At this time, the drive sense switch elements DST that are not selected are off. Herein, the switching switches SW also switch in such a way to connect the drive circuit 4 and the M drive sense lines DS0 to DS(M−1). Then, the drive circuit 4 drives the M drive sense lines DS0 to DS(M−1) and charges each of the detection electrodes E with −V (for example, ground voltage) through the selected drive sense switch element DST (second drive step).

Next, the switch element control circuit 8 turns off the (K×M) drive sense switch elements DST via the K control lines DSS0 to DSS(K−1) and brings each of the detection electrodes E into a floating state. The switching switches SW also switch in such a way to connect the read circuits 5 and the M drive sense lines DS0 to DS(M−1). Subsequently, the switch element control circuit 8 turns on the (K×M) drive sense switch elements DST via the K control lines DSS0 to DSS(K−1).

Each of the read circuits 5 amplifies a difference between linear sum signals based on an electric charge of each of the detection electrodes E read along the adjacent drive sense line via the drive sense switch element DST turning on (read step). Next, the detection circuit 6 detects a capacitance or a change in capacitance between each of the detection electrodes E of the touch panel 2b and a detected subject on the basis of a sum-of-product computation performed on the difference between the linear sum signals output from each of the read circuits 5 and the code sequence. Subsequently, the detection circuit 6 detects a position of the detected subject on the touch panel 2b on the basis of the detected capacitance or the detected change in capacitance (detection step).

Also, in the third embodiment as in the first embodiment, as illustrated in FIG. 4A, the touch panel 2b includes a non-drive region R1 and a drive region R2. The non-drive region R1 moves so as to correspond to one of the plurality of scanning signal lines corresponding to the arrow A1 selected and driven in order in a display period included in each frame of the display element 52. The drive region R2 represents a region except for the non-drive region R1. Then, at a time t1, the switch element control circuit 8 of the touch panel controller 3b drives a control line corresponding to the drive region R2 and stops driving a control line corresponding to the non-drive region R1 among the control lines DSS0 to DSS(K−1).

The touch panel controller 3b can detect capacitance distribution between each of the electrodes E and the detected subject on the touch panel 2b with a simple configuration even in the passive touch panel 2h that does not include the switch element DST built therein. Furthermore, the touch panel controller 3b is more advantageous than the touch panel controller in known touch panel system in which the sense line coupled to each detection electrode is connected to the read circuit in that the touch panel controller 3b can read a linear sum signal based on an electric charge of each of the detection electrodes E in parallel along a signal line.

Fourth Embodiment

Figure 15:
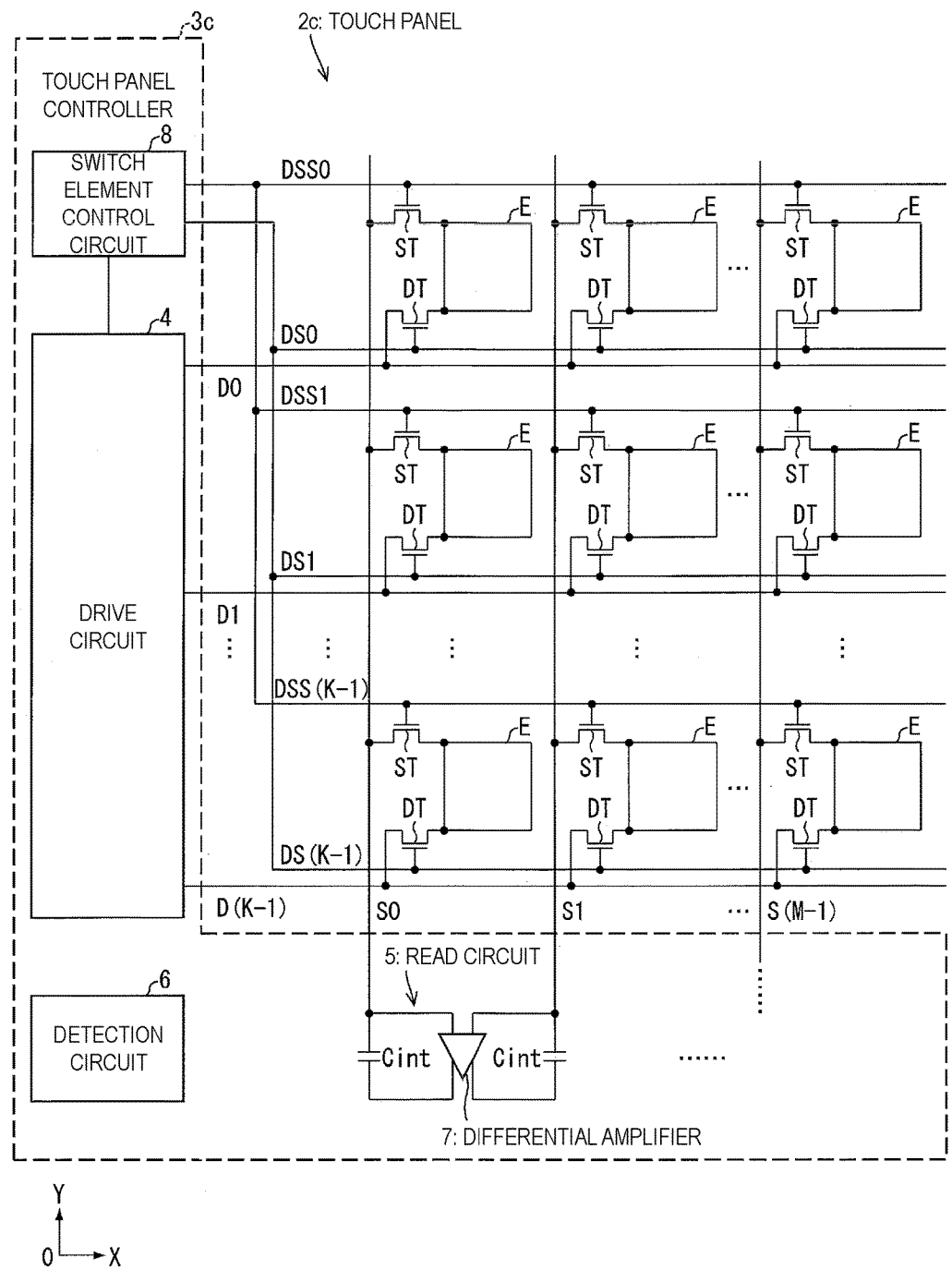
FIG. 15 is a circuit diagram illustrating a configuration of a touch panel and a touchpanel controller provided in a display module according to a fourth embodiment.

FIG. 15 is a circuit diagram illustrating a configuration of a touch panel 2c and a touch panel controller 3c according to a fourth embodiment.

The touch panel 2c includes K (where K is plural) drive lines D0 to D(K−1) and M (where M is plural) sense lines S0 to S(M−1) (drive sense lines) intersecting each other. The touch panel 2c also includes (K×M) detection electrodes E (electrodes) that correspond to intersections of the K drive lines D0 to D(K−1) and the M sense lines S0 to S(M−1) and that are arranged in matrix.

In the touch panel 2c, K drive control lines DS0 to DS(K−1) (signal lines) and K sense control lines DSS0 to DSS(K−1) are disposed so as to correspond to the drive lines D0 to D(K−1). A drive switch element DT (switch element) is formed between each of the detection electrodes E and the corresponding drive line. A sense switch element ST is formed between each of the detection electrodes E and the corresponding sense line. The drive switch element DT and the sense switch element ST are each formed of a transistor. A gate of each of the drive switch elements DT is coupled to the corresponding drive control line. A gate of each of the sense switch elements ST is coupled to the corresponding sense control line.

The touch panel 2c is provided for detecting a capacitance or a change in capacitance between each of the detection electrodes E and a detected subject such as a finger and a pen.

The touch panel controller 3c includes a drive circuit 4 connected to the K drive lines D0 to D(K−1), a switch element control circuit 8 connected to the K drive control lines DS0 to DS(K−1) and the K sense control lines DSS0 to DSS(K−1), a plurality of read circuits 5 connected to the sense lines adjacent to each other, and a detection circuit 6 that detects a capacitance or a change in capacitance between each of the detection electrodes E and the detected subject on the basis of an output of each of the read circuits 5.

Each of the read circuits 5 includes a differential amplifier 7 that amplifies a difference between outputs of the sense lines adjacent to each other and a pair of integral capacitances Cint provided between one input and one output of the differential amplifier 7 and between another input and another output thereof. Note that each of the read circuits 5 may include a switch (not illustrated) that short-circuits one terminal and the other terminal of the integral capacitances Cint and resets a state of the differential amplifier 7.

Action of Touch Panel Controller 3c

The touch panel controller 3c formed as described above works as follows.

First, the switch element control circuit 8 turns on the (K×M) drive switch elements DT via the K drive control lines DS0 to DS(K−1) and turns off the (K×M) sense switch elements ST via the K sense control lines DSS0 to DSS(K−1). Then, the drive circuit 4 drives the K drive lines D0 to D(K−1) on the basis of a code sequence of N rows and K columns, and charges or discharges each of the detection electrodes E with or to, for example, a power source potential or a ground potential (predetermined potential) through each of the drive switch elements DT.

Next, the switch element control circuit 8 turns off the (K×M) drive switch elements DT via the K drive control lines DS0 to DS(K−1) and brings each of the detection electrodes F into a floating state. Subsequently, the switch element control circuit 8 turns on the (K×M) sense switch elements ST via the K sense control lines DSS0 to DSS(K−1).

Each of the read circuits 5 amplifies a difference between linear sum signals based on an electric charge of each of the detection electrodes E read along the adjacent sense line via the sense switch element ST turning on. Next, the detection circuit 6 detects a capacitance or a change in capacitance between each of the detection electrodes E of the touch panel 2c and a detected subject on the basis of an inner product computation performed on the difference between the linear sum signals output from each of the read circuits 5 and the code sequence. Subsequently, the detection circuit 6 detects a position of the detected subject on the touch panel 2c on the basis of the detected capacitance or the detected change in capacitance.

Also in the fourth embodiment illustrated in FIG. 15 as in the first embodiment, the touch panel 2c includes a non-drive region R1 (FIG. 4) and a drive region R2. The non-drive region R1 moves so as to correspond to one of the plurality of scanning signal lines selected and driven in order in a display period included in each frame of the display element 52 (FIG. 1). The drive region R2 represents a region except for the non-drive region R1. The drive circuit 4 then drives a drive line corresponding to the drive region R2 and stops driving a drive line corresponding to the non-drive region R1 among the K drive lines D0 to D(K−1) on the basis of the code sequences M1a to M1g illustrated in FIGS. 5A to 5G, for example.

Figure 16:
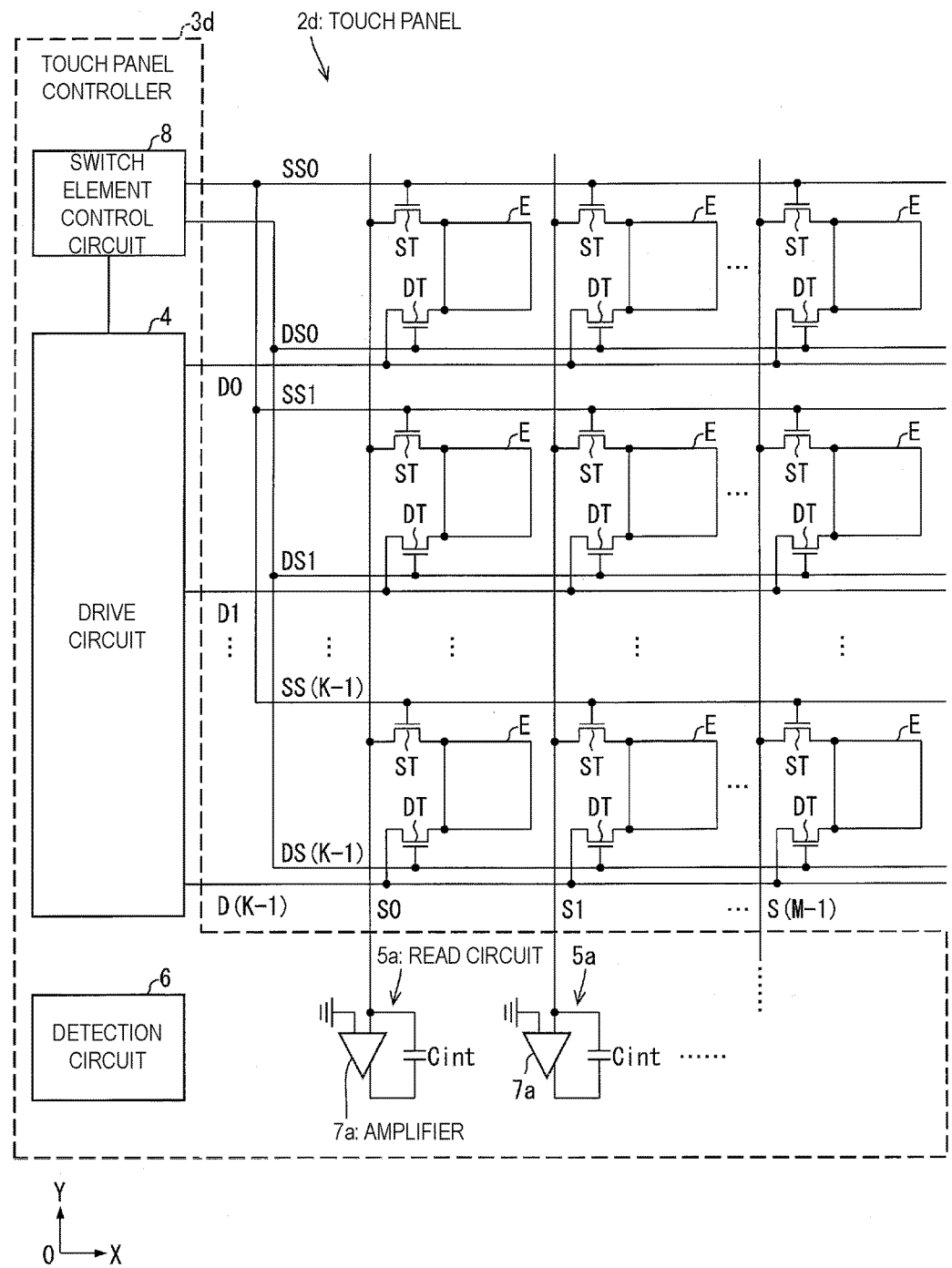
FIG. 16 is a circuit diagram illustrating a configuration of a touch panel and a touch panel controller provided in another display module according to the fourth embodiment.

FIG. 16 is a circuit diagram illustrating a configuration of another touch panel Zed and another touch panel controller 3d according to the fourth embodiment. The touch panel controller 3d performs single reading on a sense line.

The touch panel controller 3d includes M read circuits 5a. Each of M sense lines S0 to S(M−1) is connected to one of inputs of an amplifier 7a of the corresponding read circuit 5a. Another input of the amplifier 7a is AC grounded. An integral capacitance Cint is connected between the one input and an output of the amplifier 7a. Note that each of the read circuits 5a may include a switch (not illustrated) that short-circuits one terminal and the other terminal of the integral capacitances Cint and resets a state of the amplifier 7a.

Also, in the fourth embodiment illustrated in FIG. 16 as in the first embodiment, the touch panel 2d includes a non-drive region R1 (FIGS. 4A and 4B) and a drive region R2. The non-drive region R1 moves so as to correspond to one of the plurality of scanning signal lines selected and driven in order in a display period included in each frame of the display element 52 (FIG. 1). The drive region R2 represents a region except for the non-drive region R1. A drive circuit 4 then drives a drive line corresponding to the drive region R2 and stops driving a drive line corresponding to the non-drive region R1 among K drive lines D0 to D(K−1) on the basis of the code sequences M1a to M1g illustrated in FIGS. 5A to 5G, for example.

The single reading reads an absolute value of a capacitance instead of a difference component of a capacitance. Thus, the single reading is advantageous in that a value of a signal is greater than that in the differential reading, but the amplifier is more likely to be saturated.

Fifth Embodiment

Figure 17:
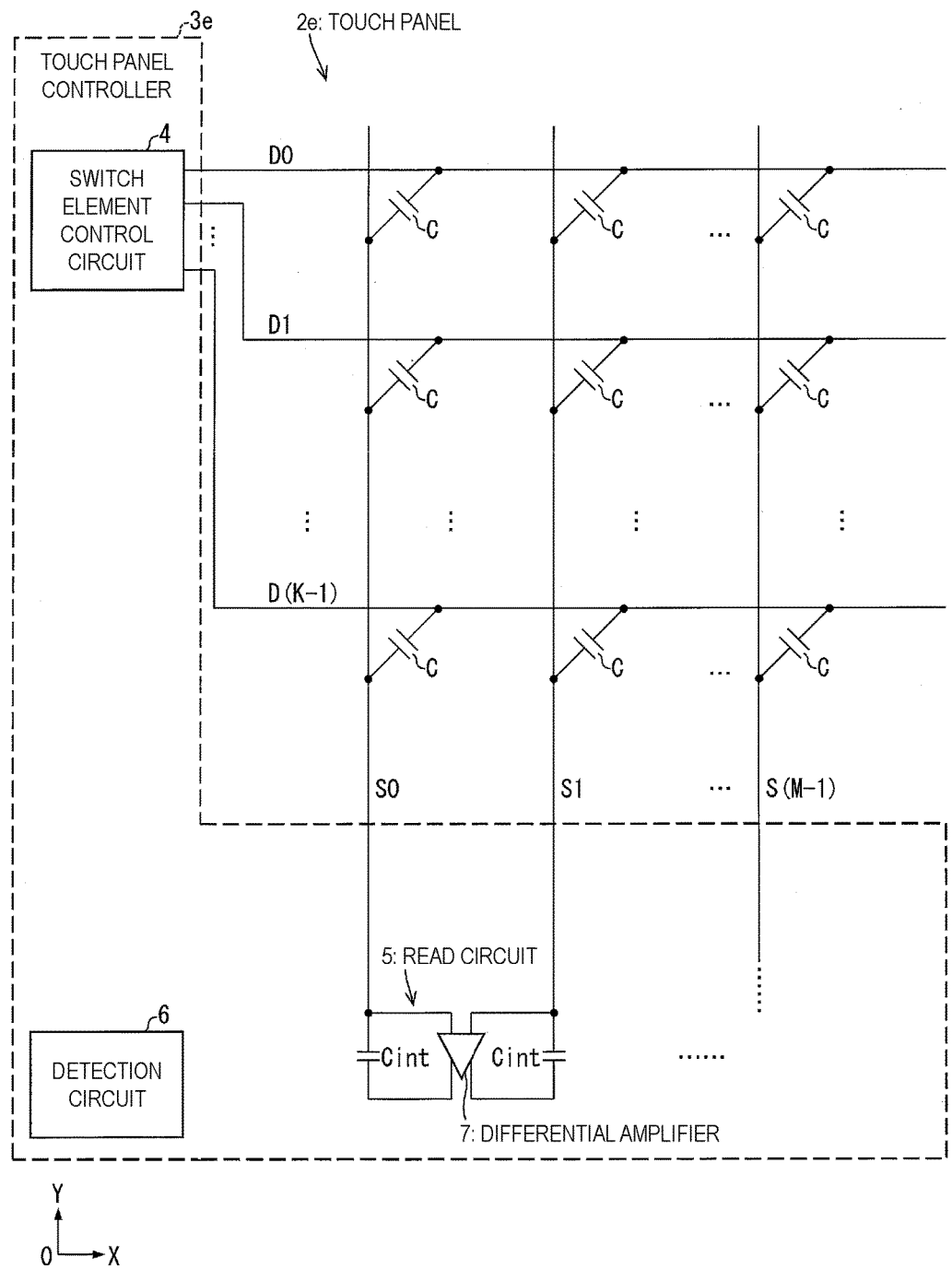
FIG. 17 is a circuit diagram illustrating a configuration of a touch panel and a touch panel controller provided in a display module according to a fifth embodiment.

FIG. 17 is a circuit diagram illustrating a configuration of a touch panel 2e and a touch panel controller 3e provided in a display module according to a fifth embodiment.

The touch panel 2e is a passive touch panel. The touch panel 2e includes K drive lines D0 to D(K−1) (signal lines), M sense lines S0 to S(M−1) intersecting the K drive lines, and a plurality of capacitors C each formed between the K drive line and the M sense line.

The touch panel controller 3e includes a drive circuit 4 that drives the K drive lines D0 to D(K−1) in parallel on the basis of a code sequence, a plurality of read circuits 5 that read a linear sum signal based on an electric charge accumulated in each of the capacitors C according to drive by the drive circuit 4 along the adjacent sense line, and a detection circuit 6 that detects electrostatic capacity distribution of the plurality of capacitors C on the basis of an inner product computation between the code sequence and the linear sum signal read by the read circuit 5.

Also, in the fifth embodiment illustrated in FIG. 1517 as in the first embodiment, the touch panel 2e includes a non-drive region R1 (FIGS. 4A and 4B) and a drive region R2, The non-drive region R1 moves so as to correspond to one of the plurality of scanning signal lines selected and driven in order in a display period included in each frame of the display element 52 (FIG. 1). The drive region R2 represents a region except for the non-drive region R1. The drive circuit 4 then drives a drive line corresponding to the drive region R2 and stops driving a drive line corresponding to the non-drive region R1 among the K drive lines D0 to D(K−1) on the basis of the code sequences M1a to M1g illustrated in FIGS. 5A to 5G.

Sixth Embodiment

Figure 18:
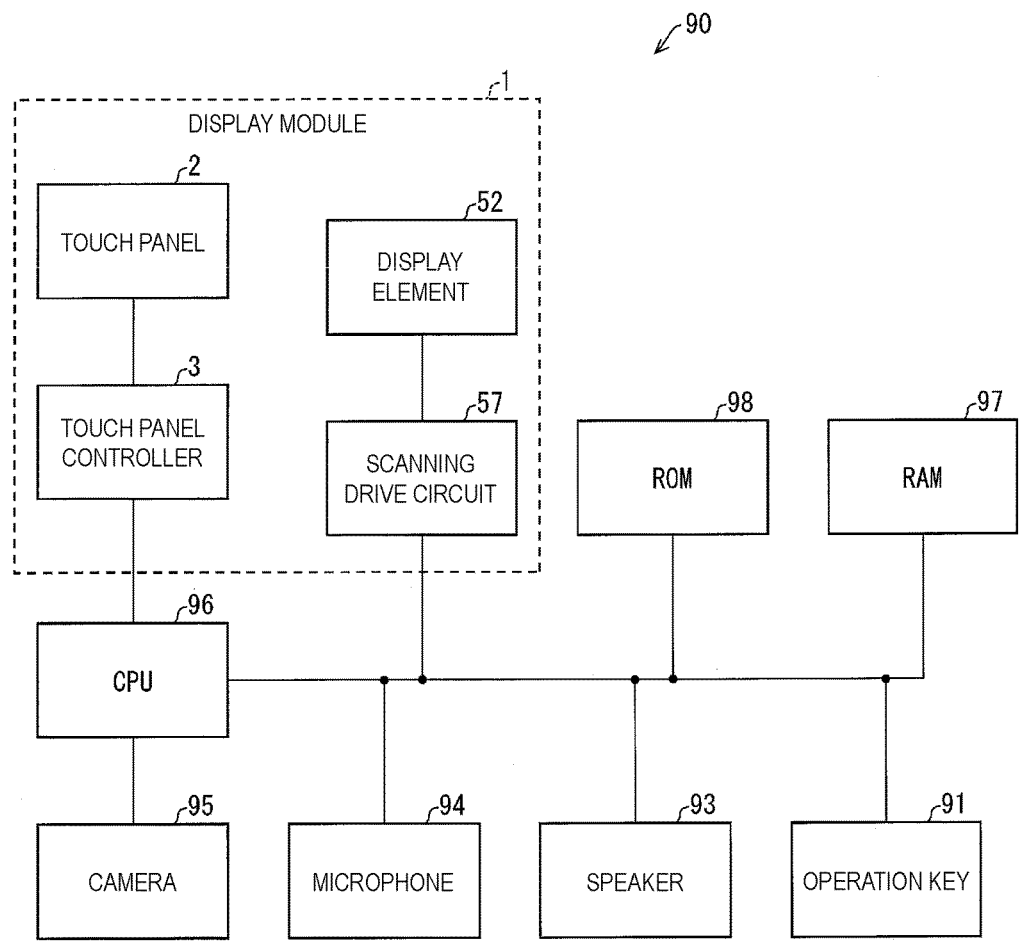
FIG. 18 is a block diagram illustrating a configuration of an electronic device according to a sixth embodiment.

FIG. 18 is a block diagram illustrating a configuration of a portable telephone 90 (electronic device) according to a sixth embodiment of the present invention. Members having the same function as the members stated in the embodiment above are appended with the same reference signs for the sake of description, and the description thereof is omitted.

The portable telephone 90 includes a CPU 96, a RAM 97, a ROM 98, a camera 95, a microphone 94, a speaker 93, an operation key 91, and a display module 1 including a display element 52, a scanning drive circuit 57, a touch panel 2, and a touch panel controller 3. Each of the components is connected to one another with a data bus.

The CPU 96 controls action of the portable telephone 90. The CPU 96 executes a program stored in the ROM 98, for example. The operation key 91 receives an input of an instruction by a user of the portable telephone 90. The RAM 97 stores data generated by execution of a program by the CPU 96 or data input via the operation key 91 in a volatile manner. The ROM 98 stores data in a non-volatile manner.

The ROM 98 is a ROM that enables writing and erasing, such as an erasable programmable read-only memory (EPROM) and a flash memory. Note that the portable telephone 90 may include an interface (IF) for connection to another electronic device with a wire, which is not illustrated in FIG. 16.

The camera 95 captures an object in response to an operation of the operation key 91 by a user. Note that image data of the captured object is stored in the RAM 97 and an external memory (for example, a memory card). The microphone 94 receives an input of a voice of a user. The portable telephone 90 digitizes the input voice (analog data). The portable telephone 90 then transmits the digitized voice to the other end of communication (for example, another portable telephone). The speaker 93 outputs a sound based on music data stored in the RAM 97, for example.

The CPU 96 controls an action of the display module 1. The CPU 96 executes a program stored in the ROM 98, for example. The RAM 97 stores data generated by execution of a program by the CPU 96 in a volatile manner. The ROM 98 stores data in a non-volatile manner.

The display element 52 displays an image stored in the ROM 98 and the RAM 97. The display element 52 overlaps the touch panel 2 or includes the touch panel 2 built therein.

Supplement

A display module 1 according to aspect 1 of the present invention includes a display element 52 including a plurality of scanning signal lines, a touch panel 2, 2b, 2c, 2d, 2e disposed on a display surface 55 of the display element 52, and a touch panel controller 3, 3a, 3b, 3c, 3e configured to control the touch panel 2. The touch panel 2 includes a plurality of signal lines (control lines DSS0 to DSS (K−1), drive lines (D0 to D(K−1))) formed in the same direction as that of the scanning signal lines. The touch panel 2 includes a non-drive region R1 and a drive region R2, the non-drive region R1 moving to correspond to one of the plurality of scanning signal lines selected and driven in order in a display period included in each frame of the display element 52, the drive region R2 representing a region except for the non-drive region R1. The touch panel controller 3 includes a drive circuit 4 configured to drive a signal line corresponding to the drive region R2 and stop driving a signal line corresponding to the non-drive region R1 among the plurality of signal lines (control lines DSS0 to DSS (K−1), drive lines (D0 to D(K−1))).

According to the configuration above, among the plurality of signal lines, a signal line corresponding to the drive region is driven and drive of a signal line corresponding to the non-drive region is stopped. Thus, the display action of the display element is not adversely affected even in a case where the touch panel is driven in the entire period of the display period included in each frame of the display element. Therefore, the display element and the touch panel do not need to be driven in a time-division manner. As a result, the display module capable of acquiring touch position data with a good SN ratio without affecting the display action of the display element can be provided.

In the display module 1 according to aspect 2 of the present invention in aspect 1 above, the touch panel 2, 2b, 2c, 2d may further include a plurality of drive sense lines (drive sense lines DS0 to DS(M−1)) intersecting the plurality of signal lines (control lines DSS0 to DSS(K−1)), a plurality of electrodes E each disposed between each of the plurality of signal lines and each of the plurality of drive sense lines, and a plurality of switch elements DST each formed between each of the plurality of drive sense lines (drive sense lines DS0 to DS(M−1)) and each of the electrodes E. The drive circuit 4 may turn on a switch element DST selected among the plurality of switch elements DST, based on a code sequence via the plurality of signal lines (control lines DSS0 to DSS(K−1)), and drive the plurality of drive sense lines (drive sense lines DS0 to DS(M−1)) at a predetermined potential. The touch panel controller 3 may further include a read circuit 5 configured to turn on all the plurality of switch elements DST after drive by the drive circuit 4 and read a linear sum signal based on an electric charge of each of the electrodes E along each of the drive sense lines (drive sense lines DS0 to DS(M−1)), and a detection circuit 6 configured to detect a capacitance or a change in capacitance between each of the plurality of electrodes E and a detected subject by a sum-of-product computation performed on the linear sum signal and the code sequence.

According to the configuration above, the display module capable of driving the active touch panel and acquiring touch position data with a good SN ratio without affecting the display action of the display element can be provided.

In the display module according to aspect 3 of the present invention in aspect 1 above, the touch panel 2e may further include a plurality of sense lines S0 to S(M−1) intersecting the plurality of signal lines (drive lines (D0 to D(K−1))), and a plurality of capacitors C each formed between each of the plurality of signal lines (drive lines (D0 to D(K−1))) and each of the plurality of sense lines S0 to S(M−1). The touch panel controller 3e may further include a detection circuit 6 configured to detect electrostatic capacity distribution of the plurality of capacitors C, based on a linear sum signal output from the plurality of sense lines S0 to S(M−1) according to an electric charge accumulated in the plurality of capacitors C by drive of the signal lines (drive lines (D0 to D(K−1))) driven by the drive circuit 4.

According to the configuration above, the display module capable of driving the passive touch panel and acquiring touch position data with a good SN ratio without affecting the display action of the display element can be provided.

In the display module according to aspect 4 of the present invention in aspect 3 above, the drive circuit 4 may drive the plurality of signal lines (drive lines (D0 to D(K−1))) in parallel, based on a code sequence, and the detection circuit 6 may detect electrostatic capacity distribution of the plurality of capacitors C by a sum-of-product computation performed on the code sequence and the linear sum signal.

According to the configuration above, the display module capable of driving the passive touch panel in parallel and acquiring touch position data with a good SN ratio without affecting the display action of the display element can be provided.

In the display module according to aspect 5 of the present invention in aspect 2 or 4 above, the code sequence may include a factor "1", a factor "−1", and a factor "0", and the drive circuit 4 may drive a signal line corresponding to the drive region R2, based on the factors "1" and "−1", and stop driving a signal line corresponding to the non-drive region R1, based on the factor "0".

According to the configuration above, the display module capable of driving the passive touch panel in parallel, based on the code sequence including the factor "1", the factor "−1", and the factor "0", and acquiring touch position data with a good SN ratio without affecting the display action of the display element can be provided.

The display module according to aspect 6 of the present invention in any one of aspect 1 to 5 above may further include a scanning drive circuit 57 configured to drive a scanning signal line of the display element 52. The drive circuit 4 may drive the plurality of signal lines (control lines DSS0 to DSS(K−1), drive lines (D0 to D(K−1))) in synchronization with a drive action of the scanning drive circuit 57.

According to the configuration above, the touch panel can be driven with a simple configuration without affecting the display action of the display element.

In the display module according to aspect 7 of the present invention in any one of aspect 1 to 6 above, the touch panel may be disposed inside the display element.

According to the configuration above, a full in-cell display module can be formed.

A touch panel controller according to aspect 8 of the present invention is a touch panel controller configured to control a touch panel disposed on a display surface of a display element including a plurality of scanning signal lines. The touch panel includes a plurality of drive lines formed in the same direction as that of the scanning signal lines. The touch panel includes a non-drive region and a drive region, the non-drive region moving to correspond to one of the plurality of scanning signal lines selected and driven in order in a display period included in each frame of the display element, the drive region representing a region except for the non-drive region. The touch panel controller includes a drive circuit configured to drive a drive line corresponding to the drive region and stop driving a drive line corresponding to the non-drive region among the plurality of drive lines.

An electronic device (portable telephone 90) according to aspect 9 of the present invention includes the display module according to any one of aspect 1 to 7.

The present invention is not limited to each of the embodiments stated above, and various modifications may be implemented within a range not departing from the scope of the claims. Embodiments obtained by appropriately combining technical approaches stated in each of the different embodiments also fall within the scope of the technology of the present invention. Moreover, novel technical features may be formed by combining the technical approaches stated in each of the embodiments.

REFERENCE SIGNS LIST

1 Display module
2 Touch panel
3 Touch panel controller
4 Drive circuit
5 Read circuit
6 Detection circuit
8 Switch element control circuit (drive circuit)
52 Display element
55 Display surface
56 Display drive circuit
57 Scanning drive circuit
R1 Non-drive region
R2 Drive region
M1$a$ to M1$g$ Code sequence
DS0 to DS(K−1) Drive control line (signal line)
DS0 to DS(M−1) Drive sense line
DSS0 to DSS(K−1) Control line (signal line)
D0 to D(K−1) Drive line (signal line)
S0 to S(M−1) Sense line (drive sense line)
E Electrode
DT Drive switch element (switch element)
DST Switch element
C Capacitor

The invention claimed is:

1. A display module comprising:
a display element including a plurality of scanning signal lines;
a touch panel disposed on a display surface of the display element; and
a touch panel controller configured to control the touch panel;
wherein the touch panel includes a plurality of signal lines formed in a same direction as that of the scanning signal lines,
the touch panel includes a non-drive region and a drive region, the non-drive region moving to correspond to one of the plurality of scanning signal lines selected and driven in order in a display period included in each frame of the display element, and the drive region representing a region except for the non-drive region,
the touch panel controller includes a drive circuit configured to drive a signal line corresponding to the drive region and stop driving a signal line corresponding to the non-drive region among the plurality of signal lines,
wherein the touch panel further includes
a plurality of drive sense lines intersecting the plurality of signal lines,
a plurality of electrodes each disposed between each of the plurality of signal lines and each of the plurality of drive sense lines, and
a plurality of switch elements each formed between each of the plurality of drive sense lines and each of the electrodes,
the drive circuit turns on a switch element selected among the plurality of switch elements, based on a code sequence via the plurality of signal lines, and drives the plurality of drive sense lines at a predetermined potential, and
the touch panel controller further includes
a read circuit configured to turn on all the plurality of switch elements after drive by the drive circuit and read a linear sum signal based on an electric charge of each of the electrodes along each of the drive sense lines, and
a detection circuit configured to detect a capacitance or a change in capacitance between each of the plurality of electrodes and a detected subject by a sum-of-product computation performed on the linear sum signal and the code sequence.

2. The display module according to claim 1,
wherein the code sequence includes a factor "1", a factor "−1", and a factor "0", and
the drive circuit drives a signal line corresponding to the drive region, based on the factors "1" and "−1", and stops driving a signal line corresponding to the non-drive region, based on the factor "0".

3. The display module according to claim 1, further comprising a scanning drive circuit configured to drive a scanning signal line of the display element,
wherein the drive circuit drives the plurality of signal lines in synchronization with a drive action of the scanning drive circuit.

4. The display module according to claim 1,
wherein the touch panel is disposed inside the display element.

5. An electronic device comprising the display module according to claim 1.

6. A display module comprising:
a display element including a plurality of scanning signal lines;
a touch panel disposed on a display surface of the display element; and
a touch panel controller configured to control the touch panel;
wherein the touch panel includes a plurality of signal lines formed in a same direction as that of the scanning signal lines,
the touch panel includes a non-drive region and a drive region, the non-drive region moving to correspond to one of the plurality of scanning signal lines selected and driven in order in a display period included in each frame of the display element, and the drive region representing a region except for the non-drive region,
the touch panel controller includes a drive circuit configured to drive a signal line corresponding to the drive region and stop driving a signal line corresponding to the non-drive region among the plurality of signal lines,
wherein the touch panel further includes
a plurality of sense lines intersecting the plurality of signal lines, and
a plurality of capacitors each formed between each of the plurality of signal lines and each of the plurality of sense lines,
the touch panel controller further includes a detection circuit configured to detect electrostatic capacity distribution of the plurality of capacitors, based on a linear sum signal output from the plurality of sense lines according to an electric charge accumulated in the plurality of capacitors by drive of the signal lines driven by the drive circuit, wherein the drive circuit drives the plurality of signal lines in parallel, based on a code sequence, and the detection circuit detects electrostatic capacity distribution of the plurality of capacitors by a sum-of-product computation performed on the code sequence and the linear sum signal.

7. The display module according to claim 6, wherein the code sequence includes a factor "1", a factor "−1", and a factor "0", and the drive circuit drives a signal line corresponding to the drive region, based on the factors "1" and "−1", and stops driving a signal line corresponding to the non-drive region, based on the factor "0".

8. The display module according to claim 6, further comprising a scanning drive circuit configured to drive a scanning signal line of the display element, wherein the drive circuit drives the plurality of signal lines in synchronization with a drive action of the scanning drive circuit.

9. The display module according to claim 6, wherein the touch panel is disposed inside the display element.

10. An electronic device comprising the display module according to claim 6.

* * * * *